US005608626A

United States Patent [19]
Ibamoto et al.

[11] Patent Number: 5,608,626
[45] Date of Patent: Mar. 4, 1997

[54] DRIVE SHAFT TORQUE CONTROLLING APPARATUS FOR USE IN A VEHICLE HAVING A POWER TRANSMISSION MECHANISM AND METHOD THEREFOR

[75] Inventors: Masahiko Ibamoto, Katsuta; Kazuhiko Sato, Hitachioota; Mitsuyoshi Okada, Katsuta; Hiroshi Kuroiwa, Hitachi; Toshimichi Minowa, Tokai-mura; Kazuhiko Yamaguchi; Naoyuki Ozaki, both of Katsuta, all of Japan

[73] Assignees: Hitachi, Ltd., Tokyo; Hitachi Automotive Engineering Co., Ltd., Ibaraki, both of Japan

[21] Appl. No.: 217,861

[22] Filed: Mar. 25, 1994

[30] Foreign Application Priority Data

Mar. 26, 1993 [JP] Japan ................................. 5-068846
Apr. 28, 1993 [JP] Japan ................................. 5-103166

[51] Int. Cl.⁶ .................................................. G06G 7/70
[52] U.S. Cl. ................... 364/424.08; 192/3.58; 192/3.62; 477/78; 477/108; 477/125; 73/862.326
[58] Field of Search ............................ 364/424.1, 424.01, 364/426.04; 477/78, 108, 45, 62, 154, 155, 61, 125, 123, 124, 904, 63, 65, 86, 60, 121, 131, 70, 30, 80, 168, 180; 192/3.58, 3.62, 3.31, 3.61, 3.3, 113.36; 74/477, 339, 359, 335, 360, 720, 655; 73/862.326; 60/39.163; 180/179

[56] References Cited

U.S. PATENT DOCUMENTS

| | | | |
|---|---|---|---|
| 3,695,122 | 10/1972 | Irie et al. ................................. | 477/160 |
| 4,018,316 | 4/1977 | McQuinn et al. ........................ | 192/3.3 |
| 4,082,011 | 4/1978 | McQuinn et al. ........................ | 477/30 |
| 4,922,424 | 5/1990 | Hiramatsu ............................. | 364/424.1 |
| 4,947,330 | 8/1990 | Hiramatsu ............................. | 364/424.1 |
| 5,021,956 | 6/1991 | Yoshimura et al. ................... | 364/424.1 |
| 5,043,894 | 8/1991 | Yamaguchi ............................ | 364/424.1 |
| 5,063,510 | 11/1991 | Jürgens et al. ........................ | 364/424.1 |
| 5,081,887 | 1/1992 | Kato ..................................... | 364/424.1 |
| 5,101,688 | 4/1992 | Pearce et al. .......................... | 192/3.58 |
| 5,133,229 | 7/1992 | Asada et al. .......................... | 364/424.1 |
| 5,150,634 | 9/1992 | Wakahara .............................. | 364/424.1 |
| 5,162,997 | 11/1992 | Takahashi .............................. | 364/424.1 |
| 5,212,998 | 5/1993 | Testerman ............................. | 74/335 |
| 5,228,368 | 7/1993 | Kato et al. ............................ | 364/424.1 |
| 5,230,256 | 7/1993 | Oizumi et al. ........................ | 364/424.1 |
| 5,235,875 | 8/1993 | Yoshida et al. ....................... | 364/424.1 |
| 5,257,188 | 10/1993 | Sakakibara et al. .................. | 364/424.1 |

FOREIGN PATENT DOCUMENTS

| | | |
|---|---|---|
| 0128471A2 | 12/1984 | European Pat. Off. . |
| 0323257A2 | 7/1989 | European Pat. Off. . |
| 0588627A1 | 3/1992 | European Pat. Off. . |
| 0529138A1 | 3/1993 | European Pat. Off. . |
| 63-254256 | 10/1988 | Japan . |
| 64-4544 | 1/1989 | Japan . |
| 4-241773 | 8/1992 | Japan . |
| 2151727 | 12/1984 | United Kingdom . |

*Primary Examiner*—Kevin J. Teska
*Assistant Examiner*—Jacques Louis-Jacques
*Attorney, Agent, or Firm*—Evenson, McKeown, Edwards & Lenahan, P.L.L.C.

[57] ABSTRACT

At a torque converter characteristic assuming unit, during non gear shift, gear ratio and an input shaft torque are assumed and also during gear shift, accessory torque is assumed. So as to correct the accessory torque a deviation between pump torque and engine torque is learned and this value is given to the accessory torque, thereby the input shaft torque can be executed and assumed. A drive shaft torque is obtained from a drive shaft torque calculating unit, a control period of the drive shaft torque is determined, a reference drive shaft torque is determined during torque control period from a reference drive shaft torque setting unit. A deviation between the reference drive shaft torque and the drive shaft torque is obtained from a torque deviation executing unit. An engine controlling unit varies the engine torque by controlling an ignition period so as to decrease substantially zero the deviation.

28 Claims, 23 Drawing Sheets

DRIVE SHAFT TORQUE CONTROLLING APPARATUS FOR USE IN A VEHICLE HAVING A POWER TRANSMISSION MECHANISM AND METHOD THEREFOR

BACKGROUND OF THE INVENTION

1. Technical Field

The present invention relates to a drive shaft torque controlling apparatus and a method therefor for use in a vehicle having a power transmission mechanism for converting a driving force from an engine through an automatic transmission and transmitting the driving force to a wheel shaft of the vehicle.

The present invention relates to a drive shaft torque controlling apparatus and a method therefor for controlling a drive shaft torque for used in a vehicle in which an engine is connected to a multi-stepped automatic transmission through a torque converter, in particularly to the drive shaft torque controlling apparatus in which a torque fluctuation (gear shift jolt) caused during the gear shift can be reduced.

2. Prior Art

In a prior art technique, in an automobile comprising a system for converting a rotation speed of an engine through an automatic transmission (AT) and for transmitting to a wheel shaft of the automobile, using an input shaft speed of the automatic transmission a control of the above converting system is performed.

In the above controlling apparatus, a disc having a groove which is carved at outer periphery is settled on an input shaft of the automatic transmission, a rotation period etc. of the groove is detected by an electromagnetic pickup (turbine sensor) and the input shaft speed of the automatic transmission is measured. Further, using the measured input shaft speed, the engine and the automatic transmission can be controlled.

In this prior art technique, since it is necessary to provide the disc and the turbine sensor so as to detect the input shaft speed of the automatic transmission, it have drawbacks that it requires a suitable cost for manufacturing the automobile and the weight of the automobile becomes to increase.

Further, so as to dissolve the above drawbacks, it is considered about a method in which using the information of a throttle opening degree and an engine speed etc., several characteristic maps and further the executing formulas, thereby the input shaft speed is assumed.

However, in the above stated method, when a torque being required for driving an engine accessory, for example, a compressor and an alternator of an air-conditioning means and a hydraulic pressure pump for use in a power steering etc., namely an accessory torque is changed in response to a load fluctuation of the engine, in accordance with an affect of the accessory torque, there appears a case in which the engine torque becomes not equal to an input torque (pump torque) of the torque converter.

As a result, it causes a problem that the more in a low speed and a low load operation area of the automobile, the more a ratio between the accessory toque and the engine torque becomes large, thereby an accuracy about the above stated assumed input shaft speed becomes low.

Further, in the other prior art techniques, so as to reduce the gear shift jolt (torque fluctuation) in a multi-stepped automatic transmission of a power transmission mechanism of an automobile, techniques are disclosed, for example, in Japanese patent laid-open publication No. 254,256/1988 and/or Japanese patent laid-open publication No. 4,544/1989.

In the former prior art technique, an ignition period delay angle amount between a starting period and a finishing period of the gear shift has stored in advance in a memory. When an input shaft speed of the multi-stepped automatic transmission becomes to a speed for judging a predetermined gear shift starting speed, it judges as a gear shift starting.

Besides, when the input shaft speed of the multi-stepped automatic transmission becomes to a speed for judging a predetermined gear shift finishing speed, it judges as a gear shift finishing. The ignition period between two periods is formed to slow with a delay angle amount part which has stored in the memory, thereby the gear shift jolt has reduced.

Further, in the latter prior art technique, an engine torque reduction amount between the starting time and the finishing time of the gear shift has stored in advance in a memory, the starting time and the finishing time of the gear shift is grasped by the change of an input/output rotation velocity ratio between the input shaft side and the output shaft side of the multi-stepped automatic transmission, the engine torque between two periods is reduced to a reduction amount part which has stored in the memory, thereby the gear shift jolt has reduced.

In each of the above stated prior techniques, the reduction amount part during the gear shift in the operation amount in which the engine torque is able to reduce the engine torque has stored at every gear shift step in advance in the memory, and according to the reduction amount part which has stored in the memory the engine torque during the gear shift is controlled according to an open controlling method.

By the way, since the gear shift jolt differs from a delicate difference in an individual multi-stepped automatic transmission and the controlling mechanism of the automatic transmission, therefore at every automobile it is necessary to search the reduction amount part of the engine torque etc. at every gear shift step, thereby it has a drawback that it is necessary to take a considerable time.

Further, even when the time is spent so as to reduce an amount part of the engine torque at every gear shift step and the searched reduction amount part is settled into the memory, by the change in time of the automatic transmission etc. it has a drawback that little by little the reduction of the gear shift jolt can not fully carried out.

Then, so as to solve the above stated drawbacks, the technique has proposed in Japanese patent laid-open 241, 773/1992. In this technique, a torque sensor is provided on a drive shaft which is an output shaft of a multi-stepped automatic transmission, an output from this torque sensor is feedback-controlled so as to perform a reference drive shaft torque determined in response to an operation condition.

As a kind of this torque sensor, for example, there is a sensor in which so as to measure a twist amount in the drive shaft a strain gauge is provided fixedly to the drive shaft which rotates at a high speed, and a transformation amount is detected at a non-contact state.

However, in the above technique shown in Japanese patent laid-open No. 241,773/1992, it is necessary to provide the torque sensor and it causes a problem that it requires a very high cost. In particularly, during the running of the automobile, it is very difficult to read on the transformation amount of the strain gauge which is provided fixedly to the drive shaft being rotated at a high speed. Further, so as to detect surely the drive shaft torque, it is necessary to employ a very large and high cost torque sensor.

SUMMARY OF THE INVENTION

An object of the present invention is to provide a drive shaft torque controlling apparatus and a method therefor for use in a vehicle having a power transmission mechanism in which an input shaft speed and an input shaft torque can be executed and assumed from an input information such as a throttle opening degree and an engine speed without detecting directly the input shaft speed and the input shaft torque of an automatic transmission through a turbine sensor and a torque sensor.

Another object of the present invention is to provide a drive shaft torque controlling apparatus and a method therefore for use in a vehicle having a power transmission mechanism in which an input shaft speed and an input shaft torque can be executed and assumed from an input information with a high accuracy.

A further object of the present invention is to provide a drive shaft torque controlling apparatus and a method therefor for use in a vehicle having a power transmission mechanism in which a low cost and a light weight drive shaft torque controlling apparatus can be obtained.

A further object of the present invention is to provide a drive shaft torque controlling apparatus and a method therefor for use in a vehicle having a power transmission mechanism in which a gear shift jolt can be reduced effectively.

To sum up, the present invention relates to a drive shaft torque controlling apparatus for use in a vehicle comprising an engine, an automatic transmission having a torque converter, and a controlling apparatus installing at least one microcomputer therein and for controlling the automatic transmission.

The drive shaft torque controlling apparatus comprises an executing and assuming means for obtaining a numerical value information relating to an input shaft torque of the automatic transmission and an input/output rotation velocity ratio, the input shaft torque is used so as to control the engine and the automatic transmission.

The drive shaft torque controlling apparatus for use in a vehicle according to the present invention comprises a detecting means for detecting information such as an engine speed, a throttle opening degree, and an output shaft speed and a gear position signal of an automatic transmission, and an executing and assuming means for obtaining a numerical value information relating to an input shaft torque of the automatic transmission and an input/output rotation velocity ratio, the input shaft torque is used so as to control the engine and the automatic transmission.

In generally, various kinds of the characteristics of the engine and the torque converter have obtained by the experimentation. For example, there are a relationship between the engine torque and the speed characteristic and a relationship between a pump capacity coefficient and a slip ratio.

Accordingly, these relationships are formed to maps and they are formulated by relating to the controlling factors, for example, the input shaft torque and the input/output rotation velocity ratio, for necessary to control the engine and the automatic transmission and they are executed through a microcomputer.

A drive shaft toque controlling apparatus for use in a vehicle characterized in that the drive shaft torque controlling apparatus comprises an engine torque executing means for obtaining an engine torque in accordance with an engine torque characteristic in which a relationship between the engine speed and the engine torque is determined and the engine speed detected through the engine speed sensor, a turbine speed grasping means for grasping a speed of a turbine constituting the torque converter, a torque ratio executing means for obtaining a torque ratio of the torque converter from the grasped turbine speed and the detected engine speed, a turbine torque executing means for obtaining a torque of the turbine from the torque ratio and the engine torque, an input/output rotation velocity ratio executing means for obtaining an input/output rotation velocity ratio between an input shaft side rotation velocity and an output shaft side rotation velocity of the multi-stepped automatic transmission from the grasped turbine speed and the drive shaft speed detected by the drive shaft sensor, a drive shaft torque executing means for obtaining the drive shaft torque in accordance with the turbine torque and the input/output rotation velocity ratio, a torque control period setting means for setting the control period of the drive torque during gear shift, a reference drive shaft torque setting means for determining a reference drive shaft during the control time in response to the drive shaft before mechanical gear shift motion starting of the multi-stepped automatic transmission, a torque deviation execution for obtaining a deviation the reference drive shaft torque determined through the reference drive shaft torque setting means and the drive shaft torque determined by the drive shaft torque executing means, and an operation amount controlling means for outputting the operation amount to the drive shaft torque operation means by obtaining an operation amount of the drive shaft torque operation means in response to the deviation.

In the engine torque executing means, the engine torque is obtained in accordance with the engine torque characteristic in which the relationship between the engine speed and the engine torque is determined and the engine speed detected by the engine speed sensor. In the turbine speed grasping means, the speed of the turbine for constituting the torque converter is grasped. Further, according to the grasped turbine speed and the engine speed detected by the engine speed sensor, the torque ratio of the torque converter is obtained by the torque ratio executing means.

In the turbine torque executing means, the turbine torque is obtained according to the torque ratio and the engine torque obtained by the engine torque executing means. In the input/output rotation velocity ratio executing means, the input/output rotation velocity ratio of the multi-stepped automatic transmission is obtained according to the grasped turbine speed and the drive shaft speed detected by the drive shaft speed sensor. In the drive shaft torque executing means, the drive shaft torque is obtained by the input/output rotation velocity ratio and the turbine torque obtained by the turbine torque executing means.

As stated above, according to the present invention, without employment of the drive shaft sensor, the drive shaft torque can be grasped only the sensor for use in an ordinary control.

During the gear shift, in the torque control period setting means, the control period of the drive shaft torque is determined. Further, in the reference drive shaft torque setting means, the reference drive shaft torque during the control period is determined in response to the value of the drive shaft torque before the mechanical gear shift motion starting of the multi-stepped automatic transmission.

In the torque deviation executing means, the deviation between the reference drive torque determined by the reference drive shaft torque setting means and the drive torque obtained by the drive shaft executing means. In the operation amount controlling means, the operation amount of the drive shaft torque operation means is obtained so as to decrease substantially zero the deviation.

DESCRIPTION OF THE INVENTION

Figure 1:
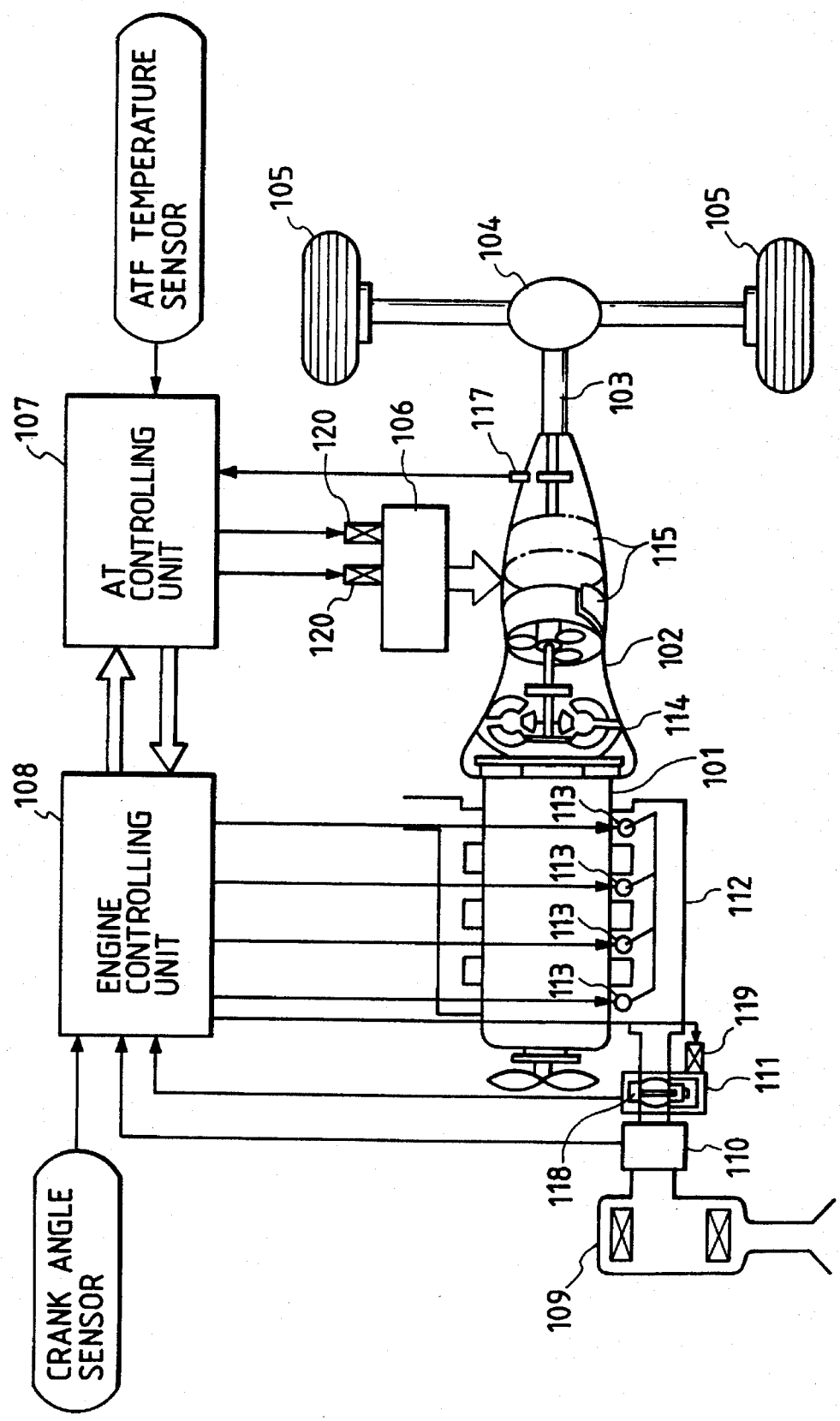
FIG. 1 is a systematic constructive view of one embodiment of a drive shaft torque controlling apparatus for use in a vehicle according to the present invention.

Hereinafter, one embodiment of a drive shaft torque controlling apparatus according to the present invention will be explained referring to the drawings. FIG. 1 is a systematic constructive view of a first embodiment of a drive shaft torque controlling apparatus for use in an automobile having a power transmission mechanism according to the present invention.

A drive shaft torque controlling apparatus of the first embodiment comprises an engine 101, a multi-stepped automatic transmission (AT) 102, a propelling shaft 103, a differential apparatus 104, driving wheels 105, a hydraulic circuit 106 of the automatic transmission (AT) 102, an automatic transmission controlling unit (ATCU) 107 of the automatic transmission (AT) 102, an electronic controlling unit (ECU) 108 of the engine 101, an air cleaner 109, an air flow sensor 110, a throttle controlling means 111, an intake manifold 112 and injectors 113.

At an interior portion of the automatic transmission (AT) 102, a torque converter 114 and a gear train 115 are branched separately, and an output shaft speed sensor 117 of the automatic transmission (AT) 102 is provided on. The electronic controlling unit (ECU) 108 receives output signals of a crank angle sensor, the air flow sensor 110 and a throttle sensor 118 and executes the engine speed etc..

Further, the electronic controlling unit (ECU) 108 output a valve opening driving signal to the injector 113 and controls a fuel amount. Further, the electronic controlling unit (ECU) 108 output a valve opening driving signal to an idle speed controlling valve (ISC valve) 119 and controls a compensate air amount. As not in shown in figure, the electronic controlling unit (ECU) 108 output an ignition signal to an ignition plug and controls an ignition time.

Besides, the automatic transmission controlling unit (ATCU) 107 performs various executions from receiving input signals of the output shaft speed sensor 117 and an automatic transmission (AT) oil temperature sensor etc. and information relating to the engine speed and the throttle opening degree outputted from the electronic controlling unit (ECU) 108. Further, the automatic transmission controlling unit (ATCU) 107 output an opening valve driving signal etc. to a changeover electromagnetic valve 120 of the hydraulic circuit 106.

Figure 2:
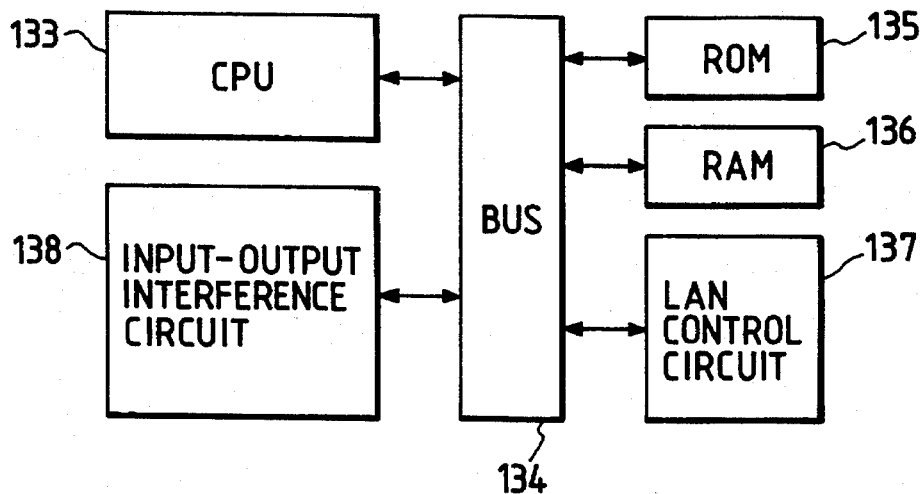
FIG. 2 is a constructive view of a controlling apparatus of one embodiment of the drive shaft torque controlling apparatus for use in the vehicle according to the present invention.

FIG. 2 shows a schematic construction of the controlling portions of the above stated automatic transmission controlling unit (ATCU) 107 and electronic controlling unit (ECU) 108. The above controlling portions comprise a central processing unit (CPU) 133, an input/output interference circuit 138 and ROM 135 and RAM 136 by sandwiching at least one bus 134.

In a case in which the automatic transmission controlling unit (ATCU) 107 and the electronic controlling unit (ECU) 108 are connected together with as shown in FIG. 1, LAN controlling circuit 137 is added on the controlling portions.

Hereinafter, the characteristic portions of the above first embodiment will be explained.

Figure 3:
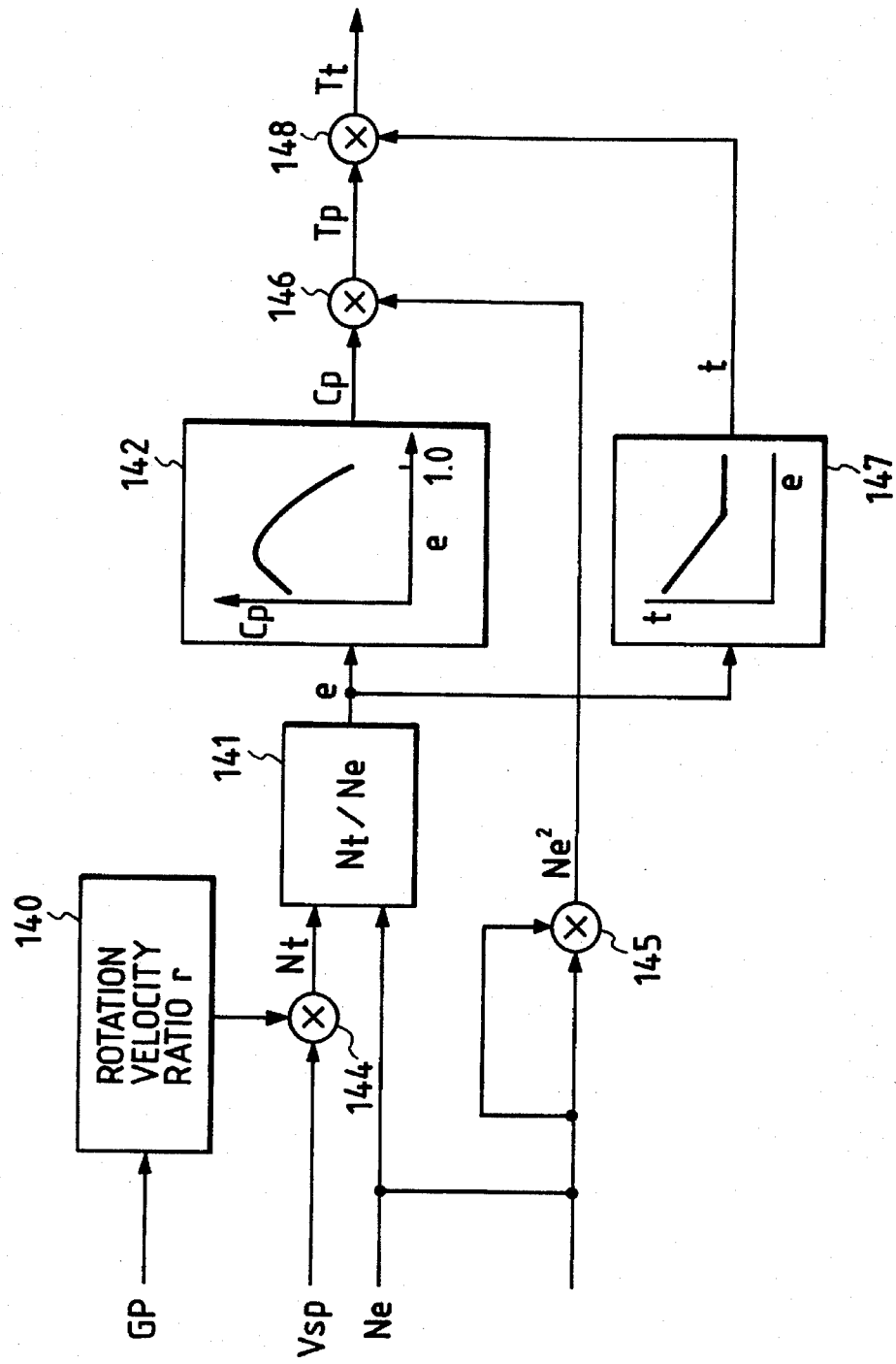
FIG. 3 is an executing and assuming block diagram of a turbine torque Tt, an input/output rotation velocity ratio r during a non gear shift.

FIG. 3 is an executing and assuming block diagram of an input/output rotation velocity ratio E and an input shaft torque (turbine torque) of the automatic transmission at a condition of during a non gear shift. The input/output rotation velocity ratio r in the present invention means a ratio between a rotation velocity of the input shaft side of the automatic transmission (AT) 102 and a rotation velocity of the output shaft side of the automatic transmission (AT) 102. A gear position signal (GP) is inputted and in a block 140 the input/output rotation velocity ratio r is determined.

Besides, an output shaft speed (Vsp) of the automatic transmission (AT) 102 is inputted from the output shaft speed sensor 117. The automatic transmission (AT) 102 during the non gear shift is met completely with a predetermined gear.

Accordingly, in a block 144 the output shaft speed (Vsp) is multiplied by the input/output rotation velocity ratio r, an input shaft speed (turbine speed) Nt is determined accurately.

$$Nt = r \times Vsp \quad \text{(formula 1)}$$

In a block 141, this turbine speed Nt is divided by the inputted engine speed Ne, and a slip ratio e in the torque converter 114 is determined.

$$e = NT/NE \quad \text{(formula 2)}$$

In a block 142, a pump capacity coefficient Cp characteristic (e–Cp characteristic) is determined from the pump capacity of the torque converter 114 which has stored in advance. An input torque of the torque converter 114, namely a pump torque Tp is expressed by a formula 3.

$$Tp = t \times Ne_2 \quad \text{(formula 3)}$$

In a block 145, $Ne^2$ is determined and in a block 146 the pump torque Tp is determined. In a block 147, a torque ratio t is determined a torque ratio t characteristic (e–t characteristic) of the torque converter 114 which has stored in advance. In a block 148, in accordance with a formula 4 the turbine torque Tt is determined.

$$Tt = t \times Tp \quad \text{(formula 4)}$$

According to the above, the input/output rotation velocity ratio r during the non gear shift and the turbine torque Tt are executed and assumed highly and accurately.

Figure 4:
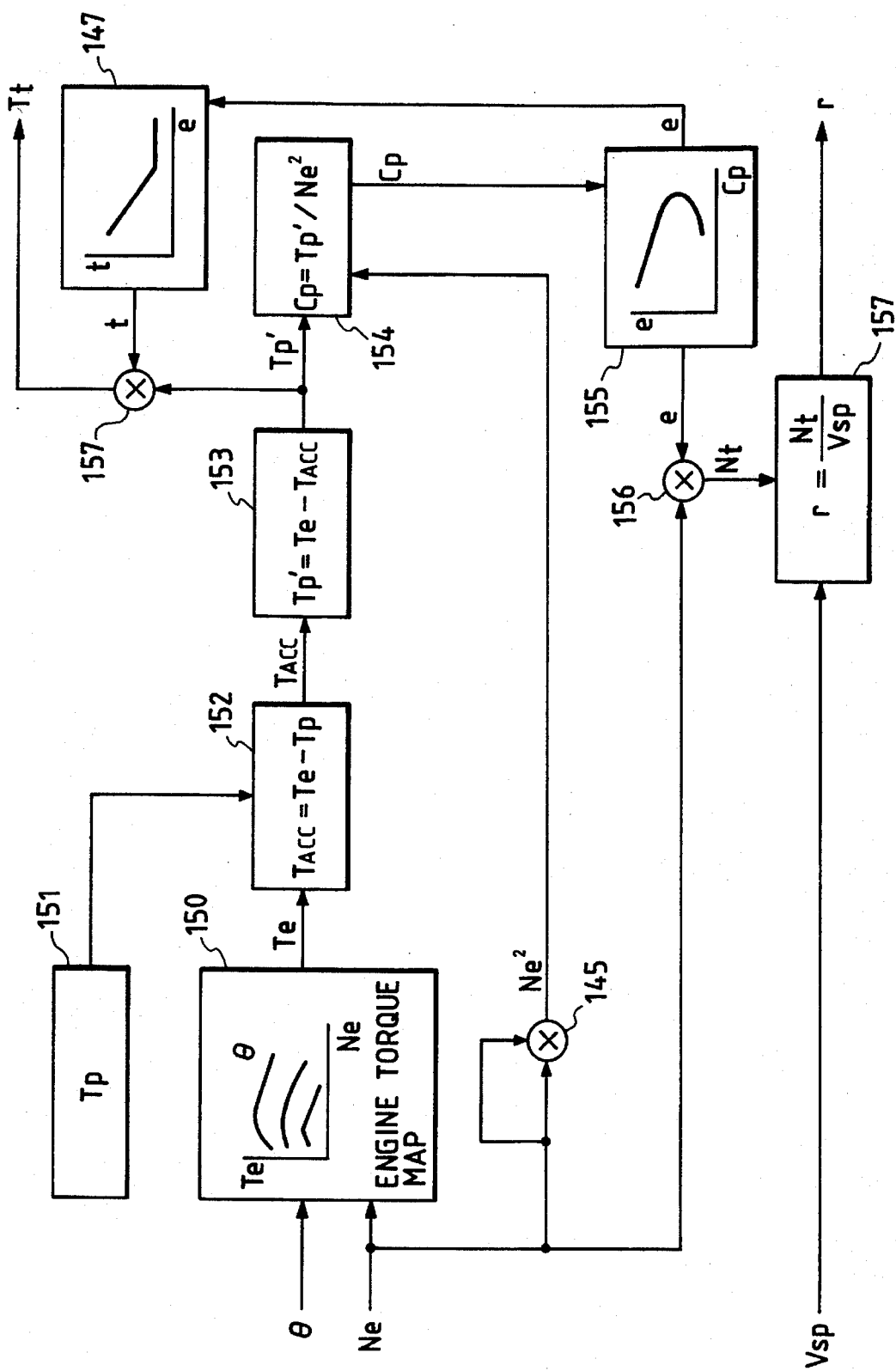
FIG. 4 is an executing and assuming block diagram of the turbine torque Tt, the input/output rotation velocity ratio r during a gear shift.

FIG. 4 is an executing and assuming block diagram of the input/output rotation velocity ratio r, which is a transitional condition for transferring the meeting from the present met gear to a next gear, and the turbine torque Tt.

In a block 150, from the engine torque characteristic map which has stored in advance, the engine torque Te is determined. In FIG. 4, it is exemplified that the engine torque Te is determined by the input information of the throttle opening degree e and the engine speed Ne.

However, it is not limited to the above example, similarly to the engine torque Te can determined from the input information of the engine intake air amount Qa and the engine speed Ne or an injection pulse width Ti and the engine speed Ne. Such an example is omitted from this description.

In a block 151, the pump torque Tp value during the non gear shift, which is immediately before the gear shift determined by FIG. 3, is stored therein. A deviation between this pump torque Tp and the engine torque Te determined in the block 150 is calculated in a block 152.

$$T_{ACC} = Te - Tp \quad \text{(formula 5)}$$

This deviation is an accessory torque $T_{ACC}$ to be loaded to the engine 101. This deviation is stored into a temporary storing apparatus. During the gear shift, this $T_{ACC}$ value is utilized for the execution.

In a block 153, a deviation between the engine torque Te determined by the block 150 and $T_{ACC}$ value is determined and this deviation is made as the pump torque Tp' during the gear shift at this time point.

$$Tp' = Te - T_{ACC} \quad \text{(formula 6)}$$

Next, in a block 154, the pump capacity coefficient Cp is determined from $Ne^2$ of the engine speed Ne calculated by the block 145 and the pump torque Tp' during the gear shift according to the calculation through the formula 3. From this e–Cp characteristic which has stored in advance in the block 155, the slip ratio e is determined.

In a block 156, according to the reversed calculation through the formula 2, the product of the slip ratio e and the engine speed Ne is determined, thereby the turbine speed Nt is determined. In a block 157, the input/output rotation velocity ratio E is determined from a formula 7.

$$r = Nt/Vsp \quad \text{(formula 7)}$$

Besides, in the block 147, from e–t characteristic, the torque ratio t is determined. And, from the torque ratio t and the pump torque Tp' during the gear shift determined in the block 153, through a formula 8 in a block 158 the turbine torque Tp during the gear shift is determined.

$$Tp = t \times Tp' \quad \text{(formula 8)}$$

Herein, in e–Cp characteristic in the block 155, the region which takes two slip ratio e values against one pump capacity coefficient Cp value exists, accordingly if leaves it as it it is impossible to determine the slip ratio e value.

Figure 5:
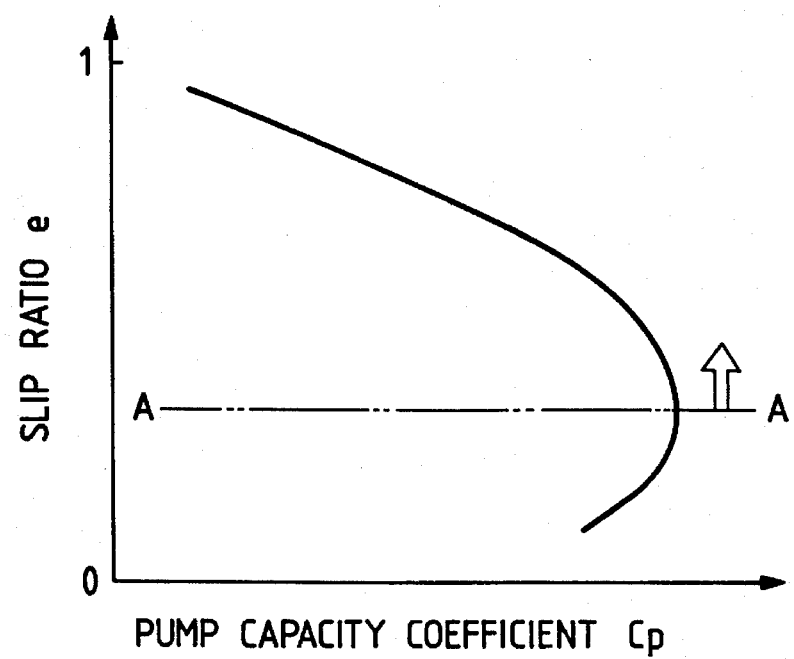
FIG. 5 is an explanatory view of a limitation range of e–Cp characteristic.

FIG. 5 is an explanatory view showing the view for coping with such a condition, in this figure a limitation region of the slip ratio e value used for in the execution is shown. Namely, commonly, the region in which the slip ratio e has small value exists at only one condition when the driver wants to start the automobile.

However, during the above stated gear shift, the region in which the slip ratio value e has such a small value does not exist. Accordingly, it is preferable to use e–Cp characteristic only an upper portion of A—A line in FIG. 5, and thereby it can be solved the above stated problem.

As stated above, it can determine the input/output rotation velocity ratio r and the turbine torque Tt during the gear shift.

Figure 6:
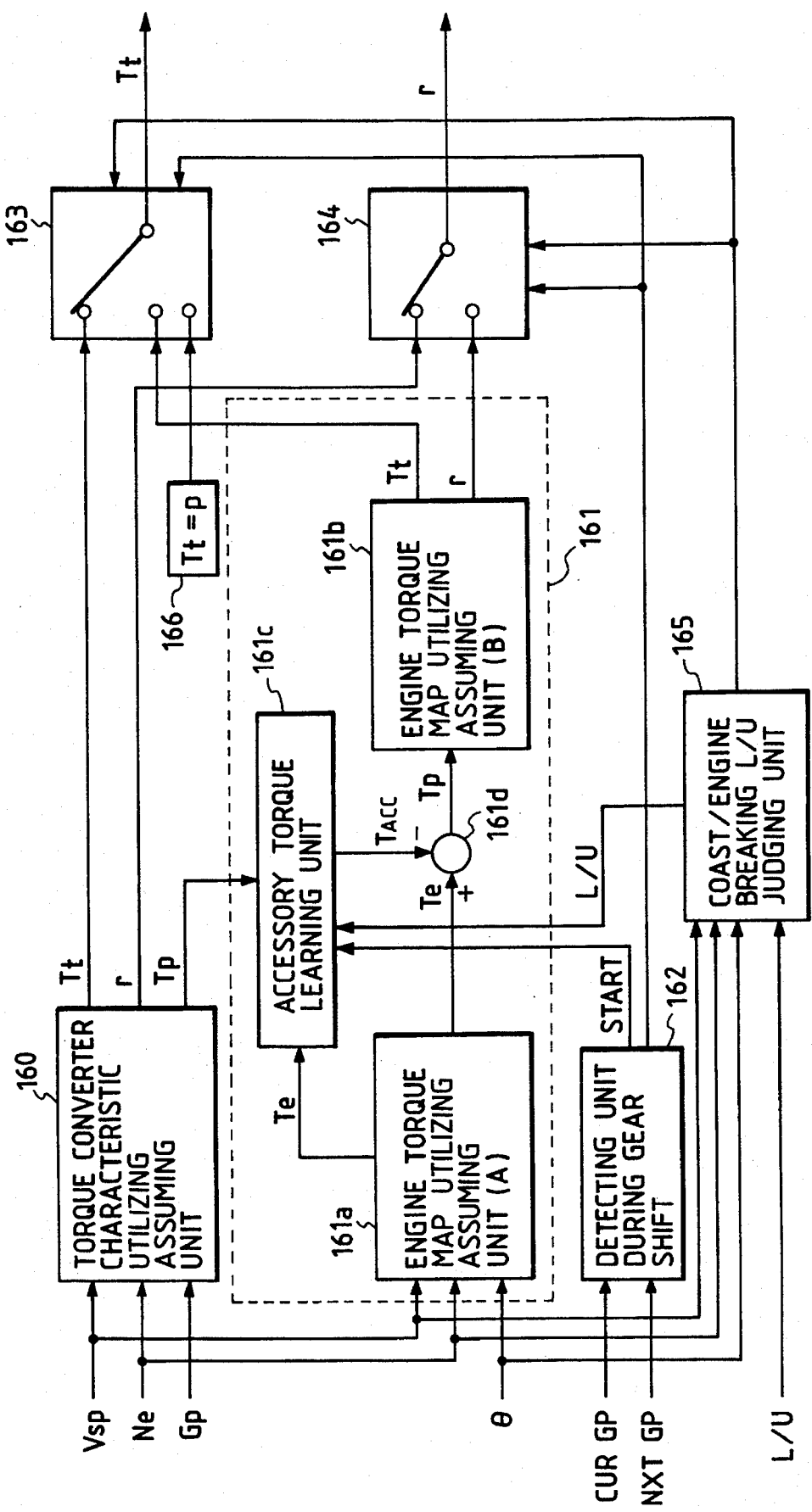
FIG. 6 is an overall controlling block diagram of one embodiment of a drive shaft torque controlling apparatus for use in a vehicle according to the present invention.

FIG. 6 is a block diagram showing an overall control of one embodiment of the drive shaft torque controlling apparatus according to the present invention.

A block 160 is a torque converter characteristic utilizing and assuming unit, and this unit includes the executing and the assuming block at the condition during the non gear shift which was explained in detail in FIG. 3.

A block 161 which is surrounded by dot line is an engine torque map utilizing and assuming unit, this unit includes the executing and the assuming block at the condition during the gear shift which was explained in detail in FIG. 4.

The judgment whether during the gear shift or not is carried out in the gear shift time detecting unit in a block 162. This judgment is carried out by a signal of CUR GP (gear position at the current time) and a signal of NXT GP (gear position which is wanted to do the gear shift or gear position at the next time).

Namely, this logic comprises when both signals are the same, it judges that the gear shift has finished, and when both signals are not the same, it judges that the gear shift going on. The method for generating CUR GP signal and NXT GP signal which are made the judgment signals are explained in FIG. 7 in latter.

When in the block 162 in the first time it judges as during the gear shift and it judges the gear shift starting, then the signal is sent to a block 161c. In the block 161c, from the engine torque Te determined immediately after the gear shift time in the block 161a and the newest pump torque Tp determined by the block 160, the accessory torque $T_{ACC}$ is stored using the formula 5.

This accessory torque $T_{ACC}$ value is held until the next gear shift starting command is reached from the block 162, it utilizes the execution for the pump torque Tp' during the gear shift time which is carried out in a block 161d. In the block 161d, using the formula 6, the pump torque Tp' is determined.

In a block 161b, as the basis of this the pump torque Tp' during the gear shift, as explained in FIG. 4, the input/output rotation velocity ratio r and the turbine torque Tt are determined.

A block 163 is a changeover means for changing over the turbine torque Tt determined in the block 160 and the turbine torque Tt determined in the block 161.

A block 164 is a changeover means for changing over the input/output rotation velocity ratio r determined in the block 160 and the input/output rotation velocity ratio r determined in the block 161.

The changeover motion of the above both changeover means is carried out by the gear shift time signal of the block 162 and the signal from a lockup (L/U), coast and engine braking judging unit in the block 165.

Herein, the lockup (L/U) indicates a condition in which the pump impeller and the turbine impeller of the torque converter 114 are connected mechanically by the hydraulic pressure. The coast and engine braking indicates a condition during the engine braking operation. The logic for changing over is as following.

(a) During the non gear shift and in case of no L/U
 . . . the block 160 is utilized.

(b) During the non gear shift and in case of L/U
 . . . the block 161 is utilized.

(c) During the non gear shift and in case of L/U and coast and engine braking
 . . . the block 161 is utilized.

(d) During the non gear shift and in case of no L/U and coast and engine braking
 . . . in a block 166, it utilizes Tp=p
and
 Tt is calculated. p value is constant.

(e) During the gear shift and in case of no L/U
 . . . the block 161 is utilized. (as during the gear shift, there is no combination about the existence of L/U and
 the
 engine braking)

This changeover logic will be explained supplementary. In the case of L/U time, it is impossible to assume utilizing the torque converter characteristic such as a block 165.

In such time, the block 161c is operated by L/U signal from the block 165, using the formula 5 the accessory torque $T_{ACC}$ is executed and stored. This accessory torque $T_{ACC}$ value is held or maintained until L/U signal stopping command is reached from the block 165.

This accessory torque $T_{ACC}$ value is utilized the execution about the pump torque Tp' in the block 165 and the execution about the turbine torque Tt, the input/output rotation velocity ratio r in the block 161b. Namely, in a case in which L/U signal generates, it is determined by utilizing the block 161.

In the case of the coast and engine braking, accompanying with the rotation drive from a wheel side of the turbine impeller of the torque converter 114, the pump impeller is driven rotatively and also the engine 101 is driven rotatively.

Namely, since the torque converter 114 becomes the driving condition at the reversed condition of the common condition, it can not utilize the above stated e–t characteristic and e–Cp characteristic as they are.

In this reversed driving condition, e–t characteristic and e–Cp characteristic have stored in advance by the experimentation and utilizing the characteristics the execution and the assumption are carried out.

In the embodiment shown in FIG. 6, in the case of the coast and engine braking, the throttle opening degree θ fully opened condition and the engine torque Te is small value, thereby the characteristic having substantially constant value is employed. Even in the above stated case, it is not very affect to the accuracy. As a result, in the block 166, it can use the turbine torque Tp=p (constant value).

Figure 7:
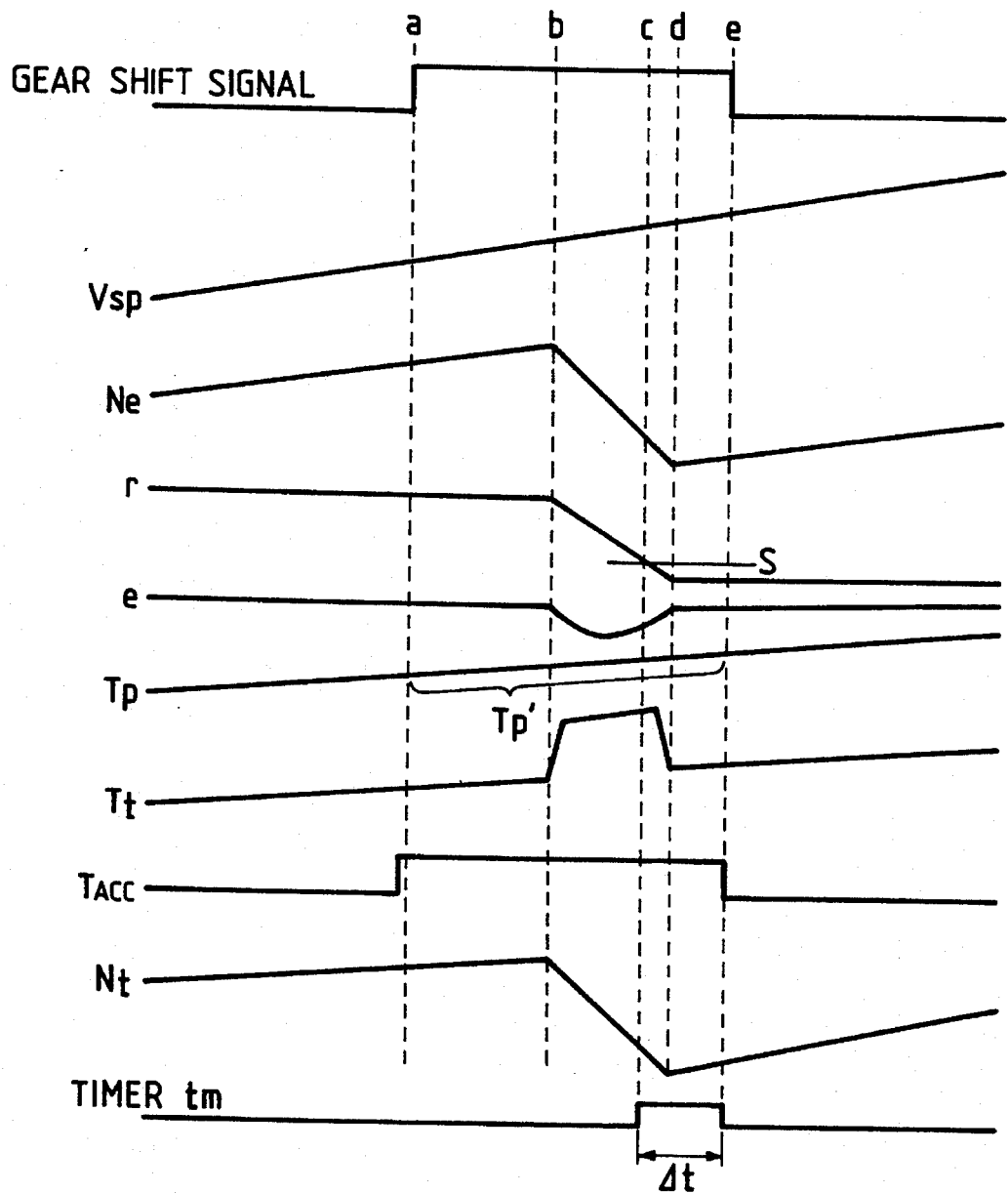
FIG. 7 is a time chart of one embodiment of the drive shaft torque controlling apparatus for use in the vehicle according to the present invention.

FIG. 7 is one example of a time chart when the control of the embodiment is carried out. FIG. 7 shows a case of an up shift.

A gear shift diagram (shift schedule) is described and stored by the output shaft speed Vsp, the engine speed Ne or the output shaft speed Vsp and the throttle opening degree θ etc.. When the actual operation point across on one of the gear shift line on the gear shift diagram, the gear shift command signal is outputted (a point a in FIG. 7).

In the period in which this gear shift command signal is outputted, it is judged as the above stated "condition during the gear shift", the executing and assuming logic during the gear shift is carried out.

The previous time from the point a, by the procedure shown in FIG. 3, it is determined by the execution of the input/output rotation velocity ratio r, the turbine speed Nt, the slip ratio e, the pump torque Tp, and the turbine torque Tt.

After time from the point a, by the procedure shown in FIG. 4, it is determined by the execution of the input/output rotation velocity ratio r, and the turbine torque Tt.

At first, from the engine torque Te determined at the point a and the pump torque Tp determined immediately before the point a, the accessory torque $T_{ACC}$ is determined from the formula 5 and this accessory torque $T_{ACC}$ value is stored and held at a–e period, namely the gear shift period.

Using this accessory torque $T_{ACC}$ value, from the formula 6 the pump torque Tp' is determined at a predetermined executing cycle. At the same time, the slip ratio e and the turbine speed Nt are determined.

When it reaches to a point b, the meeting condition of the gear begins to change and the engine speed Ne is transferred from the raise characteristic to the down characteristic. By the change of the engine speed Ne, the input/output rotation velocity ratio r, the slip ratio e, the pump torque Tp', the turbine torque Tt, the turbine speed Nt are changed largely at b–d period as shown in figure. When it reaches to a point d, the meeting of the gears is finished and the engine speed Ne is turned again to the raise characteristic.

In this embodiment, the stop of the gear shift command signal is exemplified using a following method. Against the input/output rotation velocity ratio r, a predetermined slice level S/L is provided and when the input/output rotation velocity ratio r determined by the execution becomes less than S/L, a timer tm is settled to initialized only at ∆t time and to finish at a point e. This timer finishing point is made as the stopping point of the gear shift command signal.

However, it is not limited to this method, it can employ a method in which the timer is made to work at an optional settling time from the point a and to stop. When it reaches to a point e, it returns again the logic of "during the non gear shift", and by the procedure shown in FIG. 3 each of numeral values is executed and assumed.

According to the above stated first embodiment of the present invention, without use of the detecting means such as the disc having the groove at the outer peripheral and the turbine sensor, and since it can assume the input shaft speed of the automatic transmission (AT) 102, namely the turbine speed and the input shaft torque of the automatic transmission (AT) 102, namely the turbine torque, without inviting the lower accuracy, the low cost and the light weight drive shaft torque controlling apparatus for use in the automobile can be obtained.

Next, various embodiments of a drive shaft torque controlling apparatus according to the present invention will be explained referring to drawings. The following various embodiments of the present invention are suitable for in the drive shaft torque controlling apparatus, especially the gear shift jolt can be reduced effectively.

First of all, a second embodiment of a drive shaft torque controlling apparatus according to the present invention will be explained referring to from FIG. 8 to FIG. 16.

Figure 8:
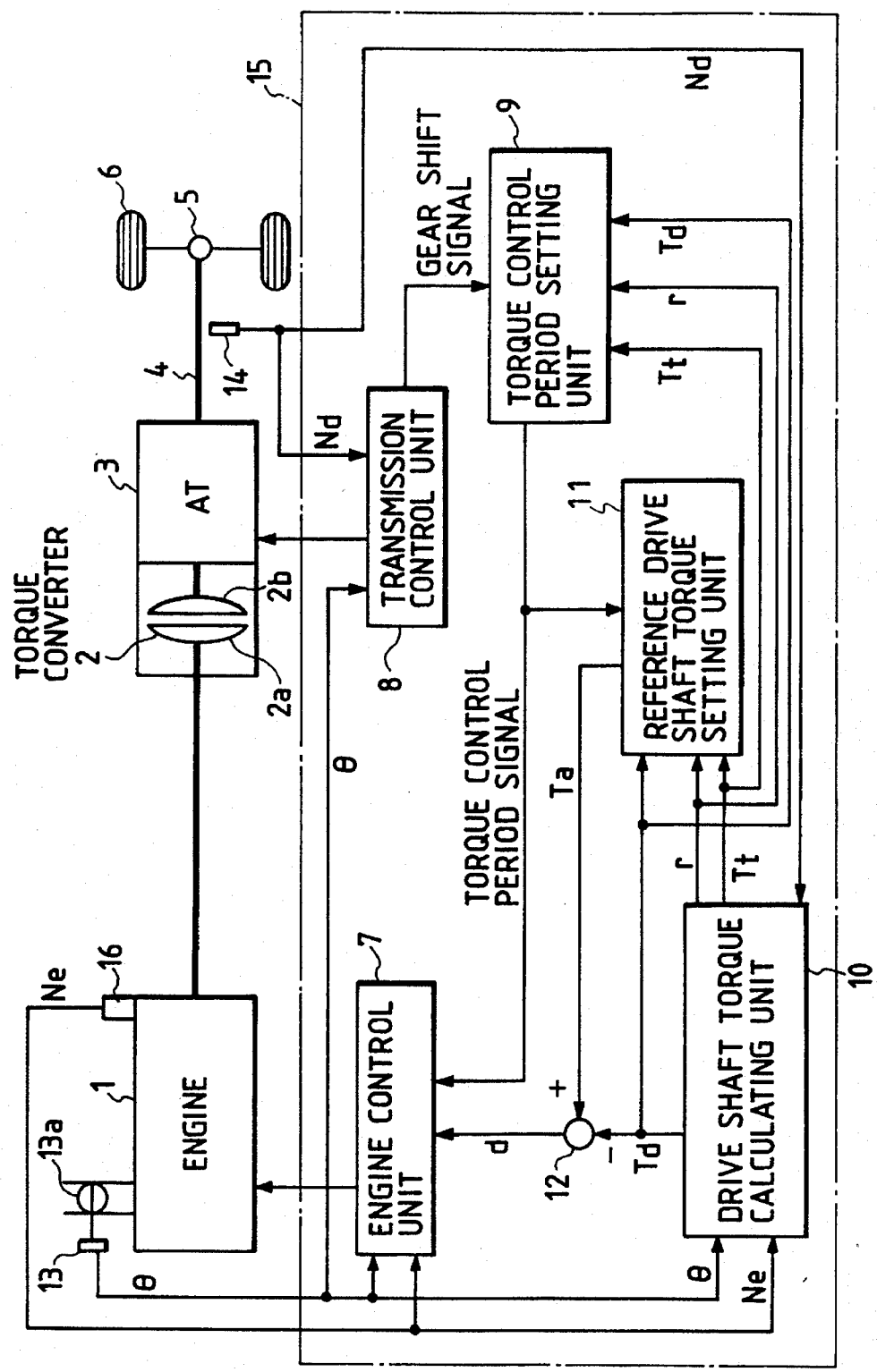
FIG. 8 is a functional block diagram showing a second embodiment of a drive shaft torque controlling apparatus for use in a vehicle according to the present invention.

As shown in FIG. 8, an output of an engine 1 is torque-amplified by a torque converter 2 and given to a multi-stepped automatic transmission 3. The speed is converted in this multi-stepped automatic transmission 3 and the engine 1 drives tires 6 through a drive shaft 4 and a final gear 5. The torque converter 2 comprises a pump impeller 2a and a turbine impeller 2b. A crank angle sensor 16 for detecting the speed etc. of the engine 1 is provided on the engine 1.

A throttle sensor 13 for detecting a valve opening degree (throttle opening degree) is provided on a throttle valve 13a for adjusting an air flow amount for supplying to the engine 1. Further, a vehicle speed sensor 14 for detecting a speed (drive shaft speed) of the drive shaft 4 is provided on the drive shaft 4.

A drive shaft torque controlling apparatus 15 in this second embodiment comprises an engine controlling unit 7, an automatic transmission controlling unit 8, a torque control period setting unit 9, a drive shaft torque calculating unit 10, a reference drive shaft torque setting unit 11 and a torque deviation executing unit 12.

The engine controlling unit 7 controls the engine 1 and the automatic transmission controlling unit 8 controls the multi-stepped automatic transmission 3. The torque control period setting unit 9 sets a control period of the drive shaft torque during the gear shift. The drive shaft torque calculating unit 10 calculates a torque (drive shaft torque) of the drive shaft 4 according to the outputs from the crank angle sensor 16, the throttle sensor 13 and the vehicle speed sensor 14.

The reference drive shaft torque setting unit 11 determines a reference drive shaft torque Ta during the torque control period, and a torque deviation executing unit 12 for obtaining a deviation d between a drive shaft torque Td obtained by the drive shaft torque calculating unit 10 and the reference drive shaft torque Ta.

The engine controlling unit 7 controls the engine 1 so as to decrease the deviation d obtained by the torque deviation executing unit 12. The deviation d is decreased to become substantial zero (including zero). The engine controlling unit 7, to be concretely, controls an ignition plug driving circuit (not shown) so as to change an ignition period so as to decrease the deviation d.

Figure 9:
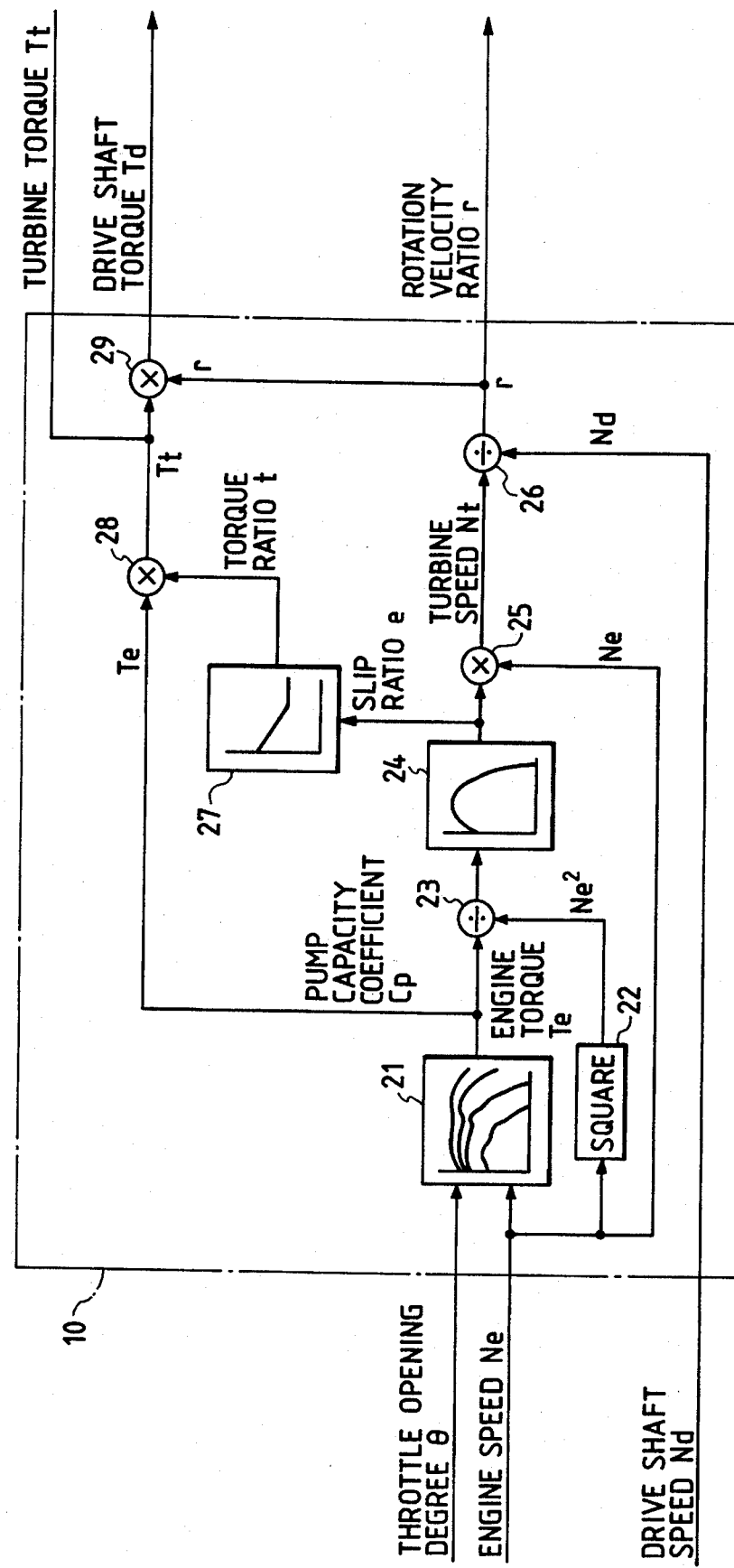
FIG. 9 is a functional block diagram showing a drive shaft torque calculating unit of the second embodiment of the drive shaft torque controlling apparatus according to the present invention.

FIG. 9 is a functional diagram of the drive shaft torque calculating unit 10.

The drive shaft torque calculating unit 10 comprises an engine torque executing unit 21 for obtaining an engine torque Te from a throttle opening degree θ and an engine speed Ne, an engine speed square processing unit 22 for obtaining a square value $Ne^2$ of the engine speed Ne, a capacity coefficient executing unit 23 for obtaining an input pump capacity coefficient Cp dividing the engine torque Te by the square value $Ne^2$ of the engine speed Ne, a slip ratio executing unit 24 for obtaining a slip ratio e of the torque converter 2 from the input pump capacity coefficient Cp.

The drive shaft torque calculating unit 10 comprises further a turbine speed executing unit 25 for obtaining a turbine speed Nt multiplying this slip ratio e by engine speed Ne, an input/output rotation velocity ratio executing unit 26 for obtaining an input/output rotation velocity ratio r of the multi-stepped automatic transmission 3 dividing the turbine speed Nt by the drive shaft speed Nd, a torque ratio executing unit 27 for obtaining a torque ratio t of the torque converter 2 from the slip ratio e of the torque converter 2, a turbine torque executing unit 29 for obtaining a turbine torque Tt multiplying the engine torque Te by the torque ratio t of the torque converter 2, and a drive shaft torque executing unit 29 for obtaining a drive shaft torque Td multiplying the turbine torque Tt by the input/output rotation velocity ratio r.

The input/output rotation velocity ratio E indicates a ratio between a rotation velocity of an input shaft side of the automatic transmission 3 and a rotation velocity of an output shaft side of the automatic transmission 3.

Figure 10:
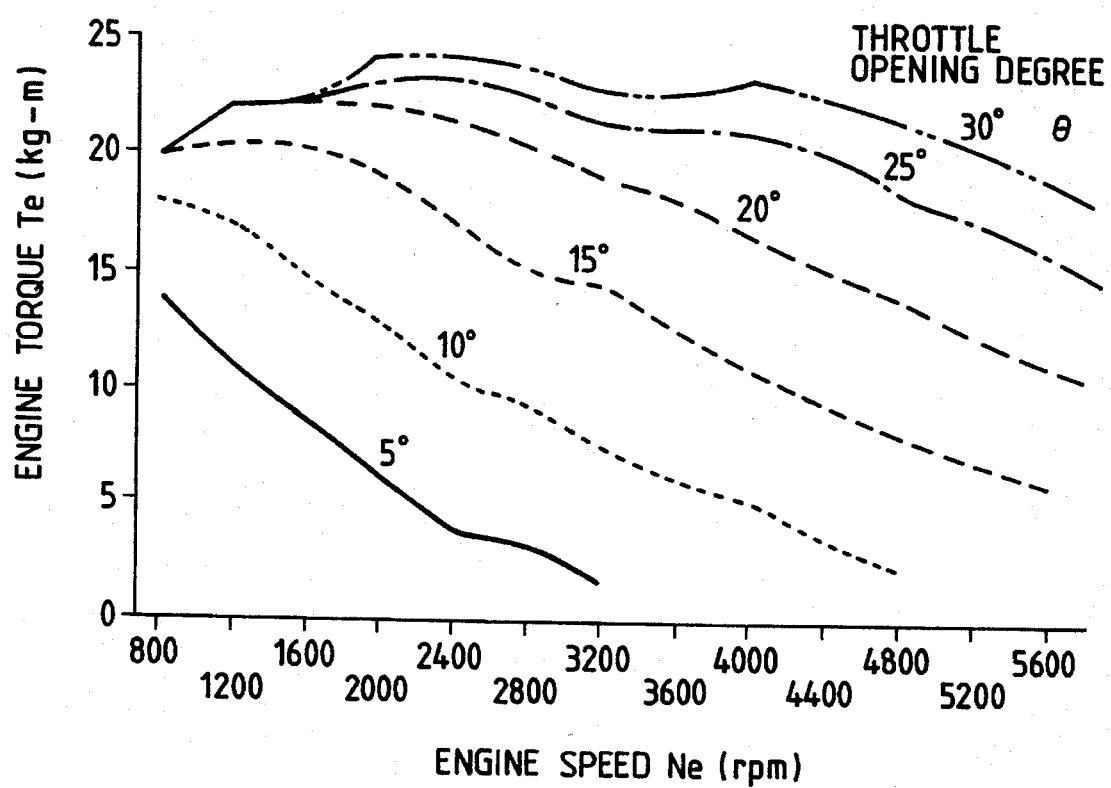
FIG. 10 is an explanatory view showing an engine torque characteristic of the second embodiment of the drive shaft torque controlling apparatus according to the present invention.

In the engine torque executing unit 21, as shown in FIG. 10, an engine torque characteristic map showing a relationship between the engine speed Ne, the throttle opening degree θ and the engine torque Te is provided.

Figure 11:
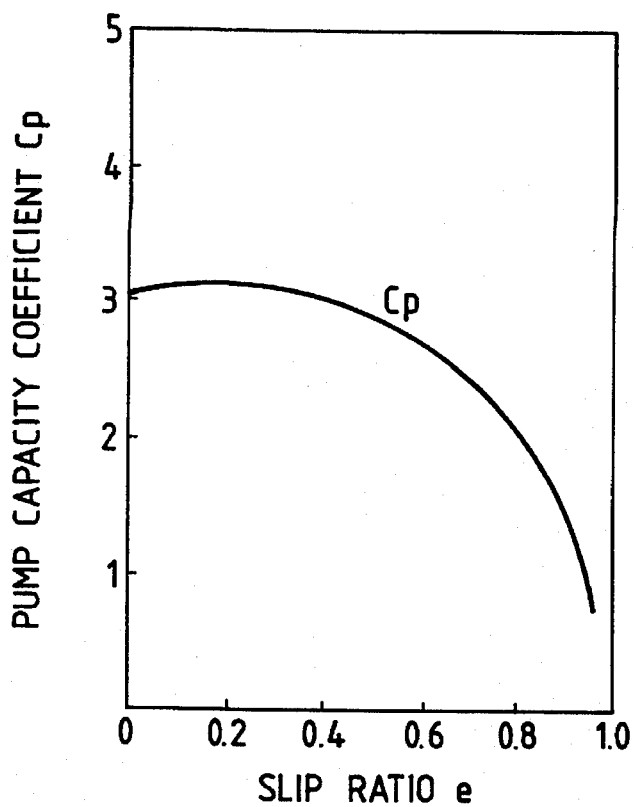
FIG. 11 is an explanatory view showing a capacity coefficient characteristic map of a torque converter the second embodiment of the drive shaft torque controlling apparatus according to the present invention.

Further, in the slip ratio executing unit 24, as shown in FIG. 11, a pump capacity coefficient characteristic map showing the input pump capacity coefficient Cp and the slip ratio e is provided.

Figure 12:
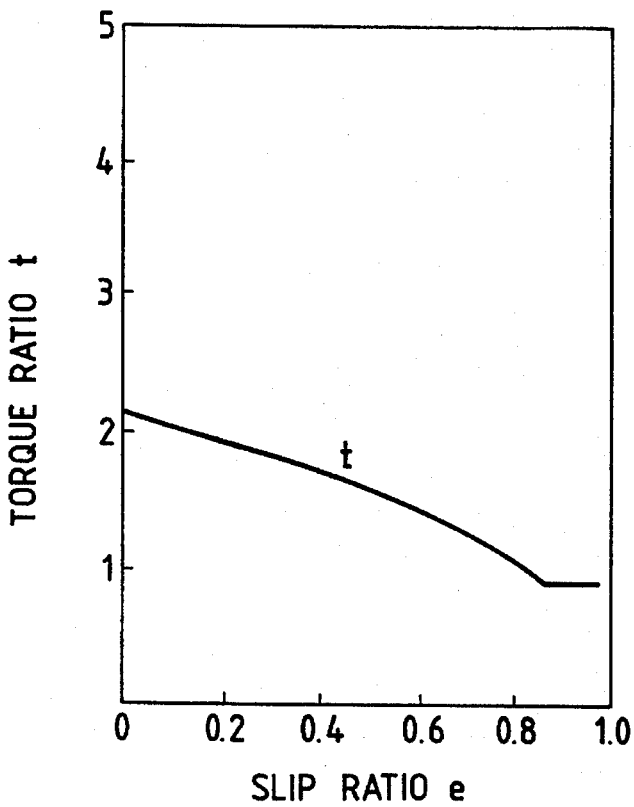
FIG. 12 is an explanatory view showing a torque ratio characteristic map of the torque converter of the second embodiment of the drive shaft torque controlling apparatus according to the present invention.

Further, in the torque ratio and slip ratio executing unit 27, as shown in FIG. 12, a torque ratio characteristic map showing the torque ratio t and the slip ratio e is provided.

Next, the motion of the drive shaft torque controlling apparatus 15 according to this second embodiment will be explained as following.

First of all, the motion of the drive shaft torque calculating unit 10 in the drive shaft torque controlling apparatus 15 will be explained.

In the engine torque executing unit 21, using the engine torque characteristic map shown in FIG. 10, the engine torque Te corresponding to the engine speed Ne and the throttle opening degree θ is obtained. In the engine speed square executing unit 22, the square value $Ne^2$ of the engine speed Ne is obtained.

Further, in the pump capacity coefficient executing unit 23, as shown in formula 9, dividing the engine torque Te by the square value $Ne^2$ of the engine speed, the input pump capacity coefficient Cp of the torque converter 2 is obtained.

$$Cp=Te/Ne^2 \qquad \text{(formula 9)}$$

In the slip ratio executing unit 24, using the pump capacity coefficient characteristic map shown in FIG. 11, the slip ratio e (=Nt/Ne) corresponding to the input capacity coefficient Cp is obtained.

Further, in the turbine speed executing unit 25, as shown in formula 10, multiplying the slip ratio e by the engine speed (=torque converter input speed) Ne, the turbine speed (=torque converter output speed) Nt is obtained.

$$Nt=e \times Ne \qquad \text{(formula 10)}$$

In the input/output rotation velocity ratio executing unit 26, as shown in formula 11, dividing the turbine speed Nt by the drive shaft speed Nd, namely dividing the input shaft speed Nt of the multi-stepped automatic transmission 3 by the output shaft speed Nd, the input/output rotation velocity ratio r of the multi-stepped automatic transmission 3 is obtained.

$$r=Nt/Nd=Td/Tt \qquad \text{(formula 11)}$$

In the torque ratio executing unit 27, using the torque ratio characteristic map shown in FIG. 12, the torque ratio r (=Te/Tt) corresponding to the slip ratio e is obtained.

In the turbine torque executing unit 28, as shown in formula 12, multiplying the torque ratio t by the engine torque (=torque converter input torque) Te, the turbine torque (=torque converter output torque) Tt is obtained.

$$Tt=t \times Te \qquad \text{(formula 12)}$$

In the drive shaft torque executing unit 29, as shown in formula 13, multiplying the turbine torque (=the input shaft torque of the automatic transmission 3) Tt by the input/output rotation velocity ratio r, the drive shaft torque (=the output shaft torque of the automatic transmission 3) Td is obtained.

$$Td=r \times Tt \qquad \text{(formula 13)}$$

Next, referring to a time chart during the up shift shown in FIG. 13, according to a flow chart during the up shift shown in FIG. 14, the motion of the drive shaft torque controlling apparatus 15 will be explained.

According to the gear shift schedule, when the automatic transmission controlling unit 8 outputs a gear shift signal of the up shift, a timer (setting time t1) of the torque control period setting unit 9 starts to motion (step 1).

This timer is settled by anticipating the motion delay of a transmission hydraulic system, at immediately before the actual operation of a gear shift clutch a time flag is settled so as to be finished.

The turbine torque Tt, the input/output rotation velocity ratio of the automatic transmission 3 and the drive shaft torque Tt are calculated at always in the drive shaft torque calculating unit 10 and at immediately before the raise down point of the time flag, namely at immediately before the actual operation of the gear shift clutch, as a turbine torque level P1, a gear shift ratio level Q1 and a drive shaft torque level R1, they are stored in a table of the torque control period setting unit 9 (step 2).

Next, the torque control period setting unit 9 predetermines a turbine torque level P2 which is a torque level value slightly larger than the turbine torque level P1 at immediately before the actual motion of the gear shift clutch to start (step 3).

Consecutively, the control period setting unit 9 determines an input/output rotation velocity ratio level Q2 in which a level value is slightly larger than an input/output rotation velocity ratio level Q3 at the gear shift finishing (step 4).

At the gear shift finishing, the gear shift clutch is met completely, the input/output rotation velocity ratio is determined fixedly. Therefore, in a case that the input/output rotation velocity ratio is determined in advance at every gear shift step and a value thereof is stored in the table etc., by referring to this table the input/output rotation velocity ratio at the gear shift finishing can be obtained.

To be concretely, a gear shift signal from the automatic transmission controlling unit 8 indicates to third step, for example, by referring to the table, the input/output rotation velocity ratio corresponding to this third step becomes the input/output rotation velocity ratio level Q3 of the gear shift finishing.

Besides, in this second embodiment, the gear shift starting indicates to a state in which the multi-stepped automatic transmission 3 starts to a mechanical motion. Further, the gear shift finishing indicates to a state in which the multi-stepped automatic transmission 3 finishes the mechanical motion. A state under the gear shift indicates a period between from the gear shift starting to the gear shift finishing.

In a case of the up shift, when the gear shift clutch starts to motion, since the engine speed Ne lowers abruptly, an inertia energy in the engine 1 is discharged and a torque fluctuation which is called the so-called "inertia phase" generates. For that reasons, so as to restraint this torque fluctuation the drive shaft torque Tt calculated in the drive shaft torque calculating unit 10 allows to follow the reference drive shaft torque Ta.

In a step 5, during between from the turbine torque level P2 of the turbine torque Tt to the gear shift level Q2 of the input/output rotation velocity ratio E, the torque feedback control is carried out. A control period of this torque feedback control is managed through the torque control period setting unit 9.

The deviation d is a torque deviation obtained between the current time drive shaft torque Td which is obtained from the drive shaft torque calculating unit 10 and the reference drive shaft torque Ta which is obtained from the reference drive shaft torque setting unit 11, and this deviation d is obtained in the torque deviation executing unit 12. The torque feedback control is carried out by controlling the engine 1 through the engine controlling unit 7 so as to decrease substantially zero the above stated deviation d.

The reference drive shaft torque pattern Ta which is determined by the reference drive shaft torque setting unit 11 is a linear pattern having a determined inclination at the drive shaft torque level R1 as the starting point. This inclination can utilize a matter which is stored in advance in the reference drive shaft torque setting unit 11 every gear shift step.

Further, since the drive shaft torque at the gear shift finishing time is estimated from the input/output rotation velocity ratio at the gear shift finishing time, the reference drive shaft torque pattern Ta may be determined so as to connect linearly the drive shaft torque Td at the gear shift finishing time and the drive shaft torque Td at the immediate before the gear shift starting time.

Figure 13:
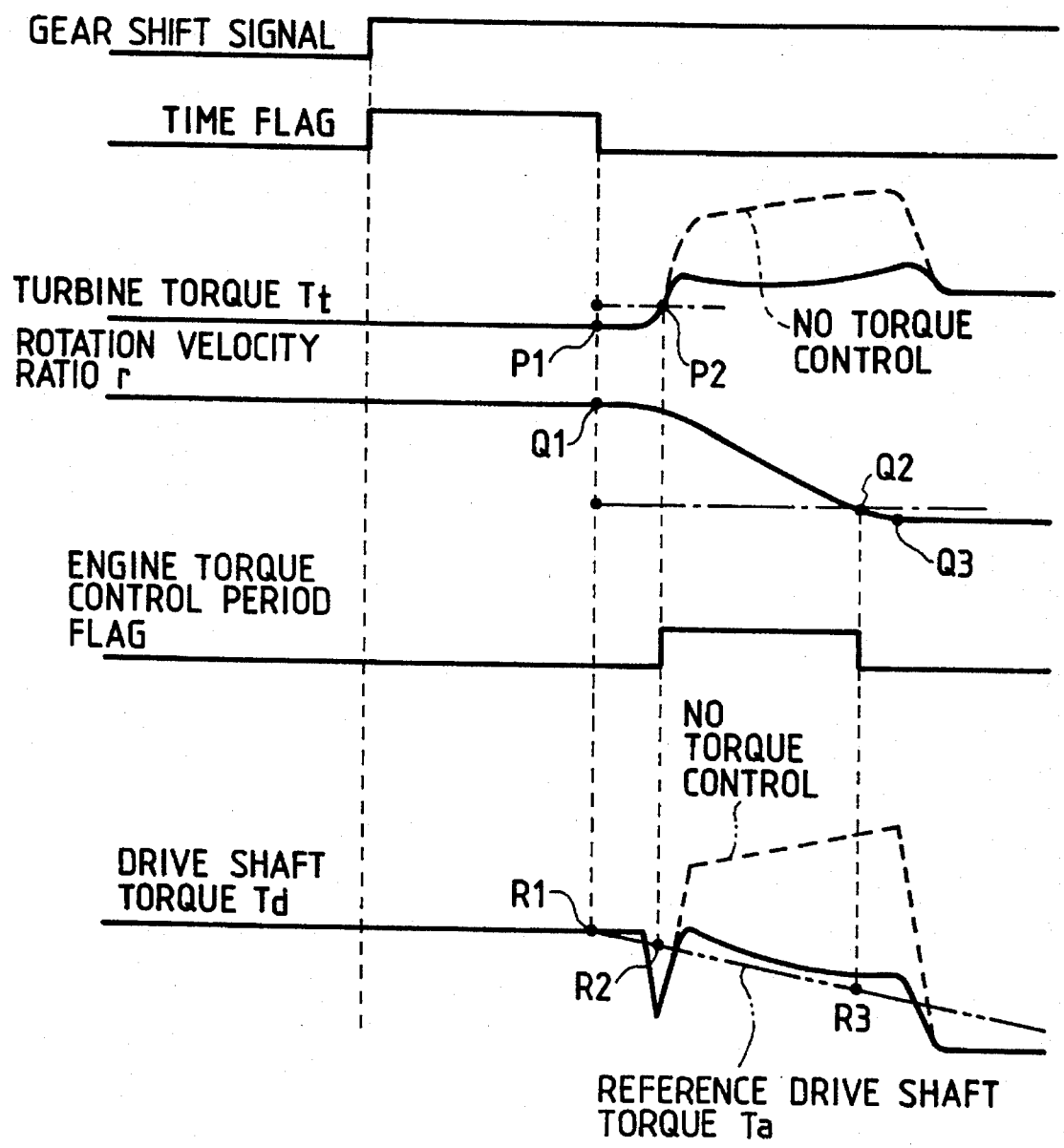
FIG. 13 is a time chart showing an up shift of the second embodiment of the drive shaft torque controlling apparatus according to the present invention.
Figure 14:
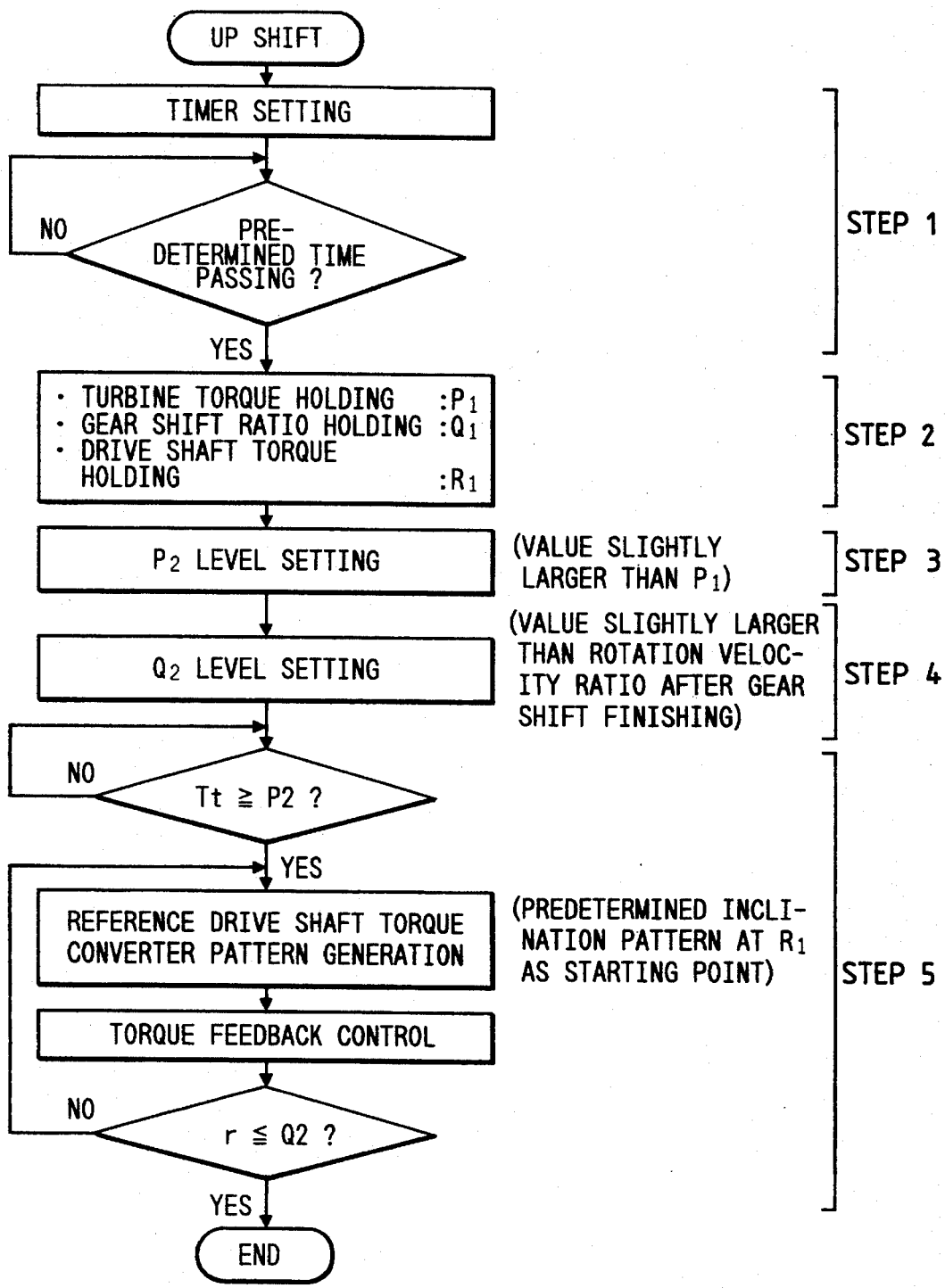
FIG. 14 is a flow chart showing the up shift of the second embodiment of the drive shaft torque controlling apparatus according to the present invention.

In a case that the drive shaft torque control is not carried out, as shown in FIG. 13 in which the drive shaft torque carve line (a torque curve line of the case in which the torque control is not carried out is shown a broken line), at the gear shift starting time the drive shaft torque Td falls down when the gear shift clutch is disconnected instantaneously, and the drive shaft torque Td becomes large when the gear shift clutch starts to be connected.

On the contrary to the above, as shown in this second embodiment, in a case that the torque feedback control is carried out, since the drive shaft torque Td is controlled to decrease substantially zero the deviation d between the drive shaft torque Td and the reference drive shaft torque Ta, it does not cause the large change in the drive shaft torque Td, thereby the gear shift jolt can be effectively.

However, in this second embodiment, by varying the ignition period, the engine torque Te is merely reduced, it can not correspond to the instant fall-down of the drive shaft torque Td observed in the gear shift starting time.

Further, in this second embodiment, since the torque feedback control at the up shift starts by the raise-up of the turbine torque Tt, the mechanical gear shift starting time of the multi-stepped automatic transmission 3 can be grasped exactly.

Because, since the change of the most nearly portion of the multi-stepped automatic transmission 3, to put it more precisely, the turbine impeller 2b (near closer to the automatic transmission 3 than the engine output shaft) of the torque converter 2 which is connected directly to the input shaft of the multi-stepped automatic transmission 3, is detected, the mechanical change of the multi-stepped automatic transmission 3 can be detected almost never without the time delay.

Further, the change of the turbine torque Tt changes more abruptly than the change of the turbine speed Nt, as a result the mechanical change of the multi-stepped automatic transmission 3 can be detected easily. Accordingly, it can avoid the appearance of the gear shift jolt in which the torque control starting time is to late with respect to the gear shift starting time.

Next, referring to a time chart at the down shift shown in FIG. 15, the motion of the drive shaft torque controlling apparatus 15 will be explained according to the flow chart at the down shift shown in FIG. 16.

When the acceleration pedal is stepped and the throttle opening degree θ becomes large, and when the automatic transmission controlling unit 8 outputs a gear shift signal with respect to the down shift, the levels of the input/output rotation velocity ratio K and the drive shaft torque Td at this time are held in the torque control period setting unit 9 in the table as the gear shift level Q1 and the drive shaft torque level R1, respectively (step 11).

The drive shaft torque Td is raised up abruptly because that the acceleration pedal is stepped and when the gear shift starts it is fallen down at once, and further with the gear shift finishing the drive shaft torque Td overshoots and raises up again and after that settles, the above phenomenon is common motion of the drive shaft torque Td.

In general, the fallen down overshoot of the torque after the gear shift starting is called as "downward overshoot" and the overshoot of the torque after the gear shift finishing is called as "upward overshoot". When there appears the "downward overshoot" or the "upward overshoot", during the gear shift since the deceleration is generated at once and in succession the acceleration is generated, therefore the driver may feel the gear shift jolt.

The "downward overshoot" causes by the energy absorption for increasing the inertia moment of the gear shift mechanism, since it is difficult to get rib of it, by suppressing the raise-up of the torque before the "downward overshoot" according to the feedback, thereby the torque fluctuation can be restrained by suppressing the downward overshoot part.

The "upward overshoot" can be restrained by smoothing the raise-up of the torque, however from aspect of a view of the gear shift feeling it is necessary to perform the moderate raise-up of the torque, thereby the torque fluctuation can be restrained by suppressing the upward overshoot part.

Next, the torque control period setting unit 9 determines the input/output rotation velocity ratio level Q2 having slightly smaller level value than the input/output rotation velocity ratio level Q3 at the gear shift finishing time (step 12).

In a step 13, the torque control period setting unit 9 estimates the drive shaft torque Td in which the drive shaft torque Td settles after the gear shift finishing time and predetermines the drive shaft torque levels R2 and R3 which are sliced at a predetermined rate between the drive shaft torque level R5 and the drive shaft torque level R1. When the gear shift has finished and the drive shaft torque Td is settled, such a drive shaft torque Td is obtained from the current time engine torque Te and the input/output rotation velocity ratio r at the gear shift finishing time.

In a step 14, so as to restrain the raise-up of the drive shaft torque Td before the "downward overshoot", during from when the drive shaft torque Td becomes the drive shaft torque level R2 to when the input/output rotation velocity ratio r becomes the input/output rotation velocity ratio level Q2, the torque feedback control can be carried out. The control period of the torque feedback control is managed by the torque control period setting period unit 9.

During the above stated control period, from the reference drive shaft torque setting unit 11, the reference drive shaft torque pattern Ta1 having a predetermined inclination starting from the drive shaft torque level R2 is outputted, and so as to decrease substantially zero the deviation d between this reference drive shaft torque pattern Ta1 and the current time drive shaft torque Td, thereby the engine torque Te is controlled.

In a step 15, the torque control period setting unit 9 estimates again the gear shift level R5 in which the drive shaft torque Td is settled and determines the gear shift torque having slightly smaller level value than the gear shift level R5 as the drive shaft torque level R4.

Further, the reasons why in the step 13 the drive shaft torque Td when after the gear shift finishing time the drive shaft torque Td is settled and again in the step 5 the drive shaft torque Td estimates are that since when the drive shaft torque Td estimates the engine torque Te is used, by using the engine torque Te nearly to the engine torque Te when the drive shaft torque Td is settled, as far as possible it is to obtain the exact drive shaft torque Td.

In a step 16, so as to restrain the "upward overshoot" of the drive shaft torque Td, during from when the drive shaft torque Td becomes the drive shaft torque level R3 from the drive shaft torque level R3, the torque feedback control can be carried out. This control period of the torque feedback control is managed by the torque control period setting unit 9.

During the above stated control period, from the reference drive shaft torque setting unit 11, the reference drive shaft torque pattern Ta2 having a predetermined inclination starting from the drive shaft torque level R3 is outputted, and so as to decrease substantially zero the deviation d between this reference drive shaft torque pattern Ta2 and the current time drive shaft torque Td, thereby the engine torque Te is controlled.

In the case of the down shift, as stated above, from before the mechanical gear shift starting of the multi-stepped automatic transmission 3 the drive shaft torque Td start to fluctuate, and after the gear shift finishing time since the fluctuation remains as the "upward overshoot" however, in this second embodiment even after the gear shift finishing time the engine torque control is carried out, thereby the reduction in the gear shift jolt can be realized.

As stated above, according to this second embodiment, since in the case of the gear shift the feedback control of the drive shaft torque Td is carried out, it is unnecessary to search the fluctuation amount of the engine torque Te at every gear shift step during the gear shift and to settle the map of it as shown in the conventional technique, thereby the time can be saved.

Further, every gear shift, the reference drive shaft torque Ta determines and since so as to decrease substantially zero the deviation d between the reference drive shaft torque Ta and the actual drive shaft torque Td the feedback control is carried out, the multi-stepped automatic transmission 3 and the hydraulic control mechanism etc. may change in the time lapse, accordingly regardless of the change in the time lapse, the gear shift jolt can be reduced effectively.

Further, when the torque feedback control is carried out, it is unnecessary to provide the high cost sensor for obtaining the drive shaft torque Td by the execution, and since it changes only at the software aspect the controlling apparatus for the vehicle on the automatic transmission 3 is mounted, the reduction of the moderate gear shift jolt can be realized, the productivity can be heighten and also the reduction in the manufacturing cost can be attained.

Further, so as to obtain the drive shaft torque Td, it is necessary to use the crank angle sensor 16, the throttle sensor 13, the vehicle speed sensor 14, however these sensors are necessitated basically for the ordinary control etc., thereby it is unnecessary to add new sensor so as to carry out this second embodiment.

Figure 17:
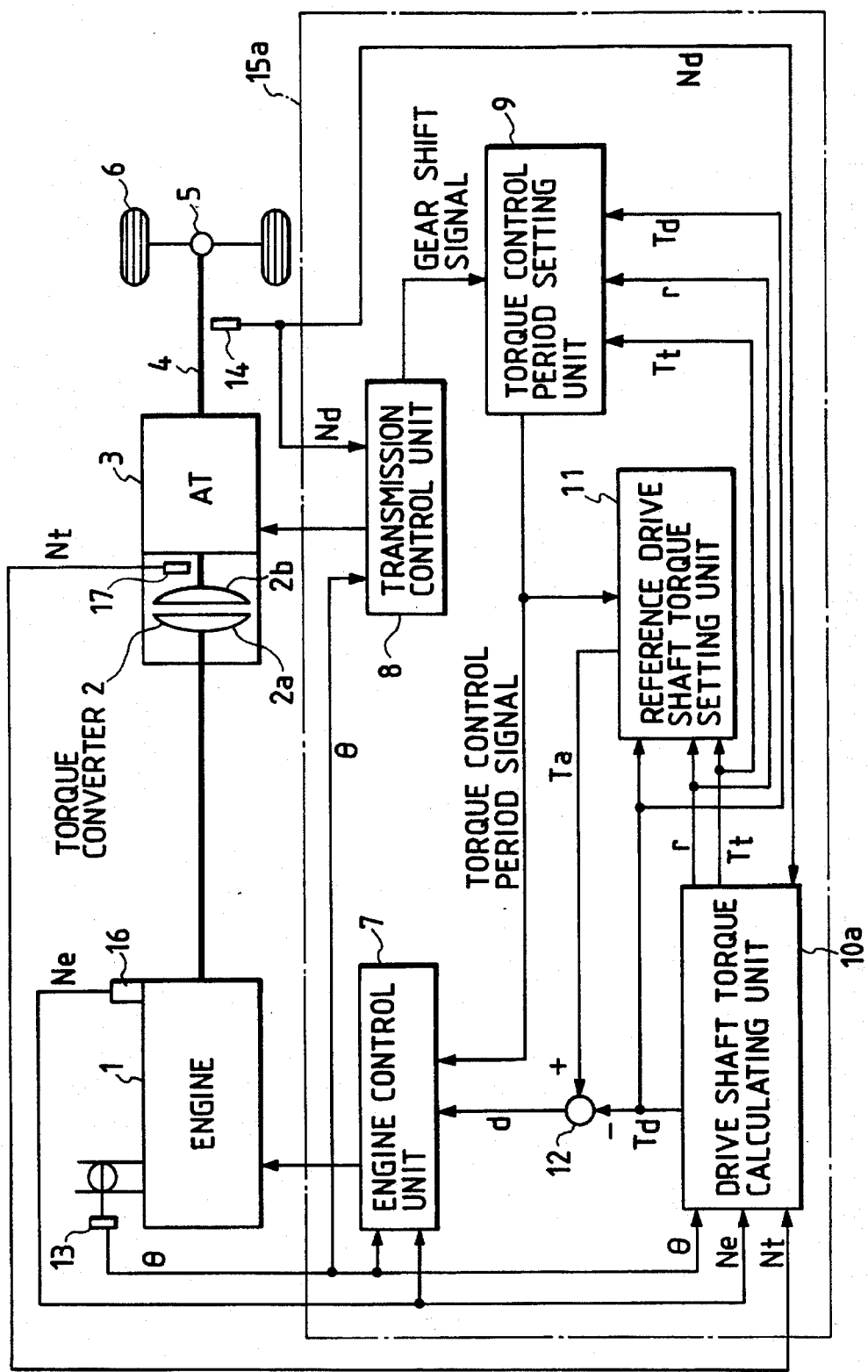
FIG. 17 is a functional block diagram showing a third embodiment of a drive shaft torque controlling apparatus according to the present invention.

Next, a third embodiment according to the present invention will be explained referring to FIG. 17 and FIG. 18.

In the second embodiment the turbine speed Nt is obtained through the execution, besides in this third embodiment a turbine sensor 17 for detecting the turbine speed Nt is provided on the turbine impeller 2b of the torque converter 2, using this turbine sensor 17 the turbine speed Nt is detected directly.

Figure 18:
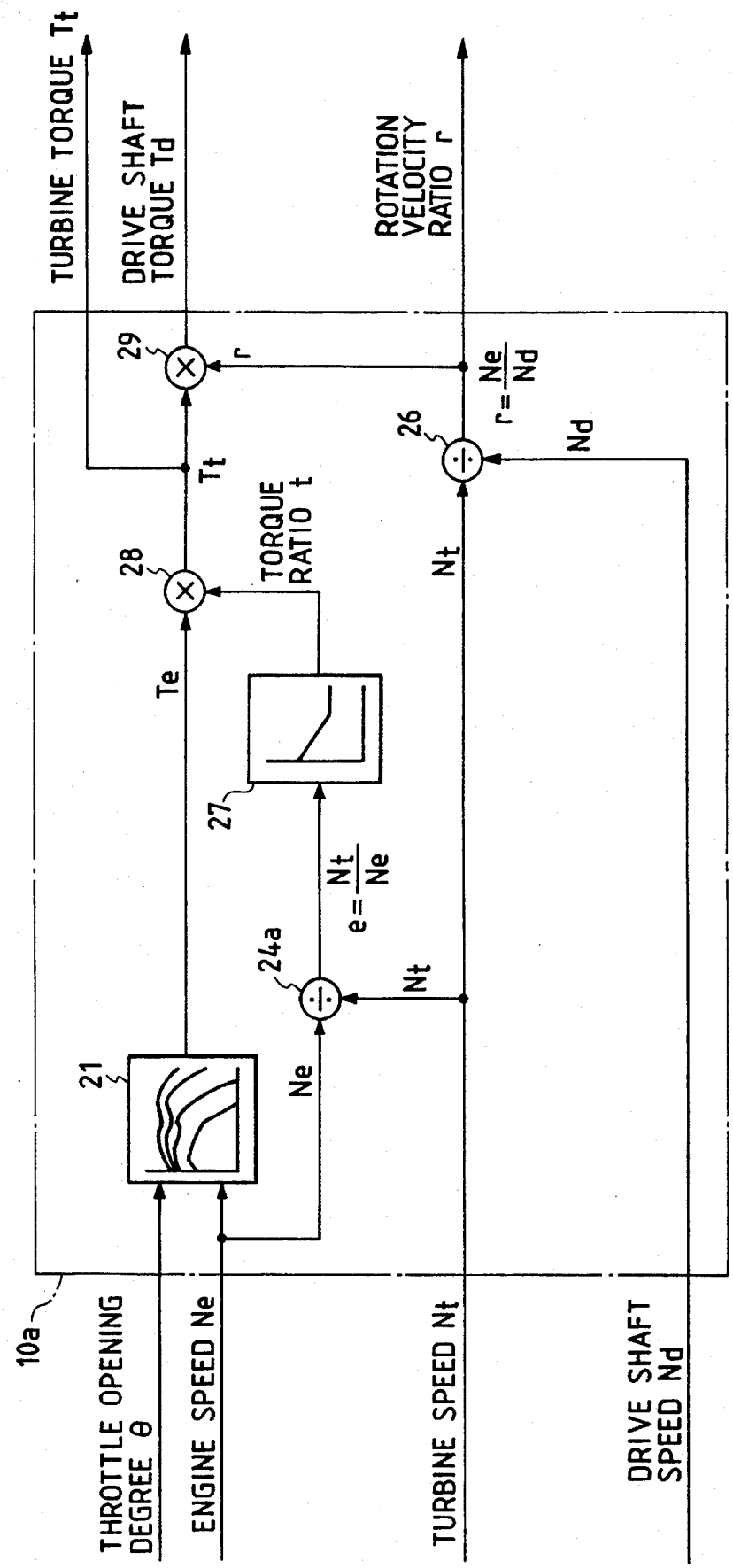
FIG. 18 is a functional block diagram showing a drive shaft torque calculating unit of the third embodiment of the drive shaft torque controlling apparatus according to the present invention.

Accordingly, in the drive shaft torque calculating unit 10a, as shown in FIG. 18, it is unnecessary to provide the engine speed square processing unit 22, the pump capacity coefficient executing unit 23, the slip ratio executing unit 24 and the turbine speed executing unit 25, which are necessary to obtain the turbine speed Nt in the second embodiment.

Further, in this third embodiment, since in the process for obtaining the torque ratio t of the torque converter 2, it is necessary to obtain the slip ratio e of the torque converter 2, the drive shaft torque calculating unit 10a has a rotation ratio executing unit 24a in which the rotation ratio e is obtained dividing the turbine speed Nt detected through the turbine sensor 17 by the engine speed Ne.

According to this third embodiment, since using the turbine sensor 17 the turbine speed Nt can be grasped directly, the precise turbine speed Nt can be utilized, such a turbine speed Nt is precisely more than the turbine speed Nt obtained through the various executing processes. As a result, the drive shaft torque Td etc. can be obtained more precisely and the control accuracy can be improved.

Figure 19:
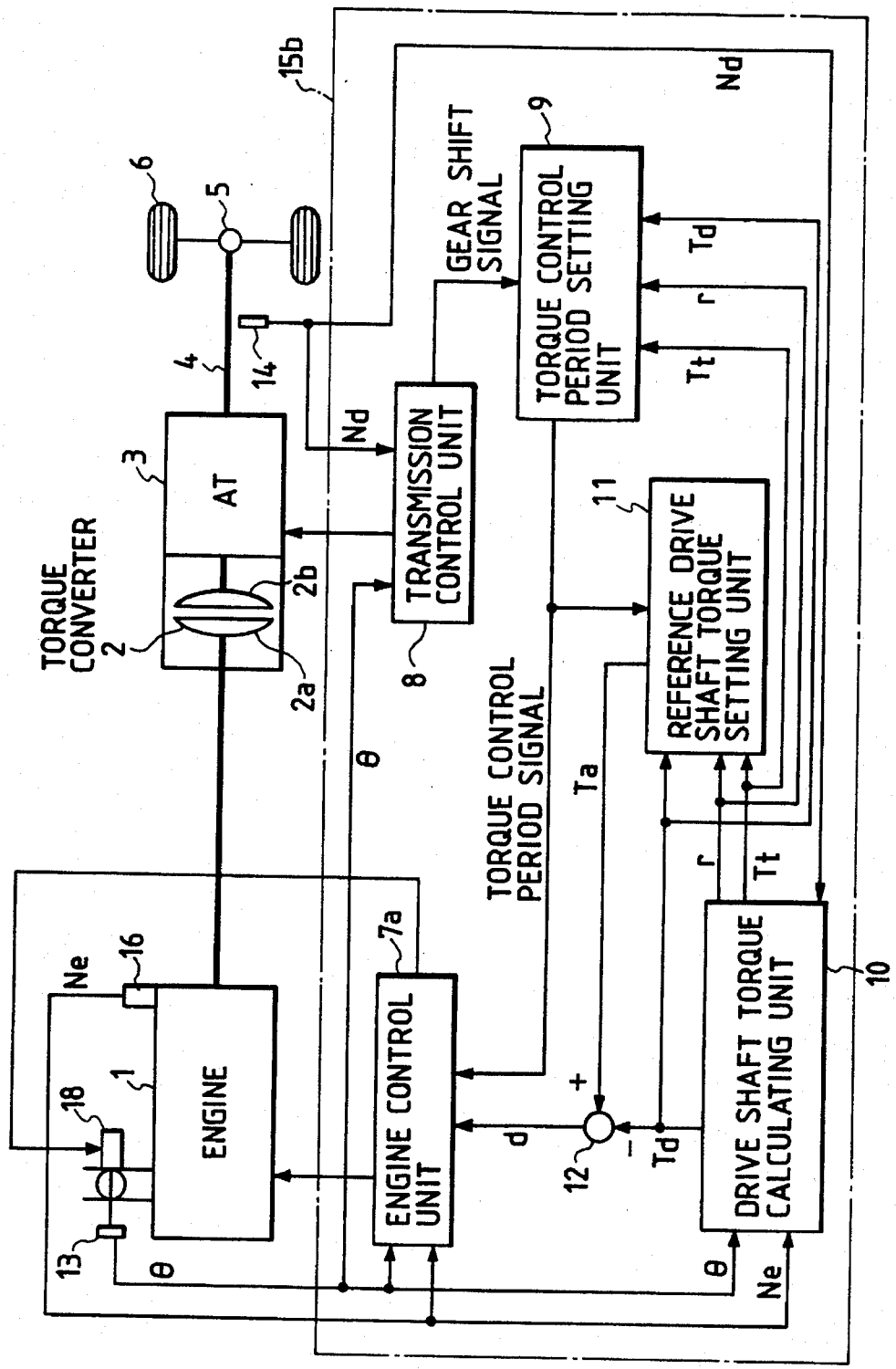
FIG. 19 is a functional block diagram showing a fourth embodiment of a drive shaft torque controlling apparatus according to the present invention.
Figure 20:
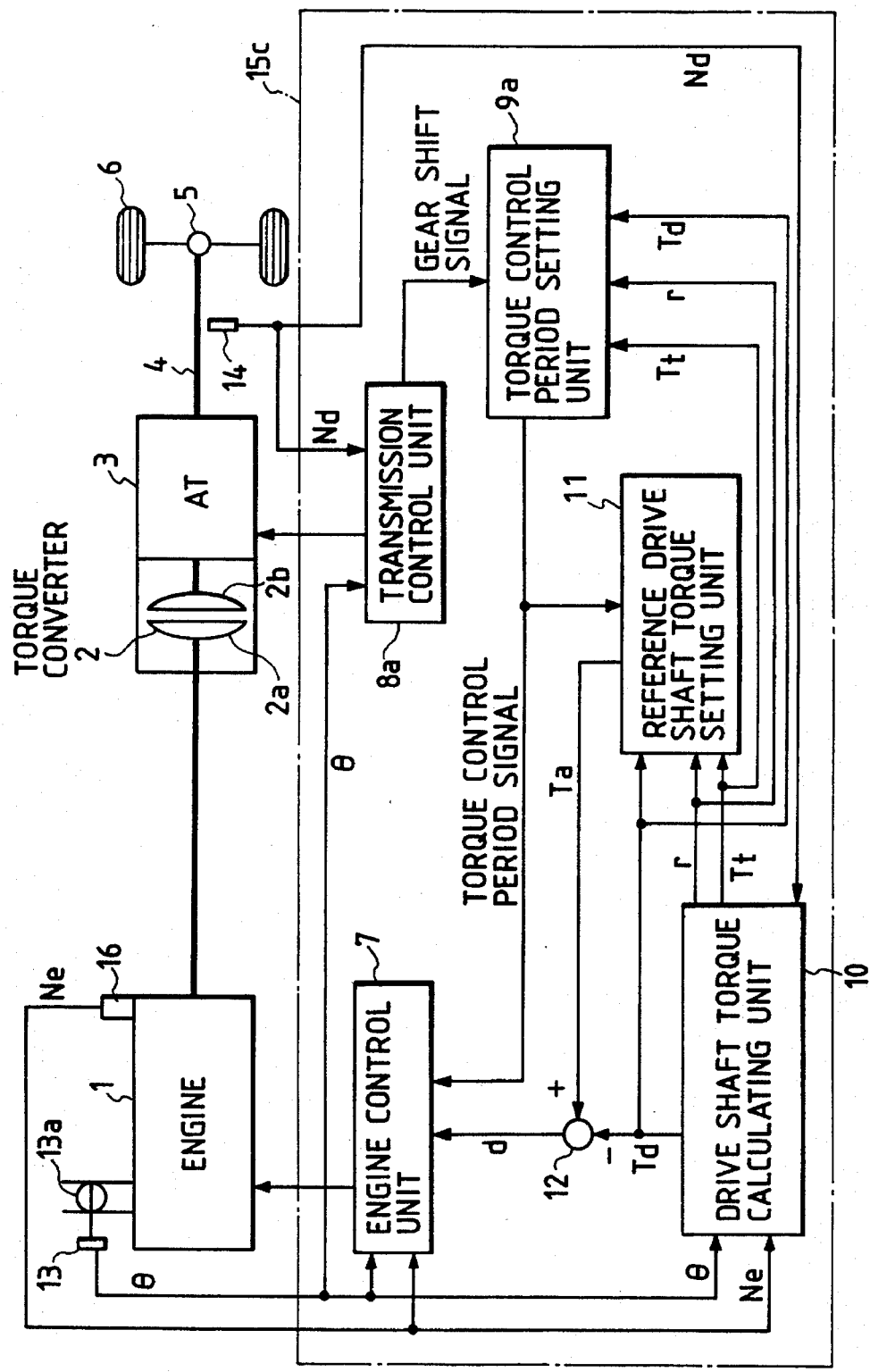
FIG. 20 is a functional block diagram showing a fifth embodiment of a drive shaft torque controlling apparatus according to the present invention.

Next, a fourth embodiment according to the present invention will be explained referring to FIG. 19.

This fourth embodiment subjects to an apparatus in which an electronic throttle valve 18 is provided and this electronic throttle valve 18 can be driven a main body of the throttle valve in response to the electric signal.

Namely, the throttle valve 13a shown in the first embodiment is mechanically connected to the acceleration pedal and is operated only in response to the operation amount of the acceleration pedal, besides since the electronic throttle valve 18 shown in this fourth embodiment is operated by the electric signal, the electronic throttle valve 18 can operate independently with respect to the operation amount of the acceleration pedal.

In this fourth embodiment, the throttle opening degree $\theta$ can be changed in response to the deviation d between the reference drive shaft torque Ta and the actual drive shaft torque Td. In generally, the air system control is performed the slightly delay response, however since it can control freely and the torque control range has large, thereby it is possible to control any direction of the increasing torque or the decreasing torque.

Accordingly, according to this fourth embodiment, it can act effectively to the part which is necessary to increase the drive shaft torque Td, to put it concretely, in case of the up shift with the fallen down part (R2 time point in FIG. 13) of the torque, in other words it is called as the torque phase and in the case of the down shift with the "downward overshoot" part and further the torque fluctuation can be lessened.

Further, for the same purpose, the throttle valve opening degree $\theta$ may vary in response to the deviation d between the reference drive shaft torque Ta and the actual drive shaft torque Td.

Further, from the aspect of the control responsibility, it is preferred to control the ignition period. Accordingly, with respect to the part in which the actual drive shaft torque Td is larger than the reference drive shaft torque Ta and so that it is necessary to reduce the drive shaft torque Td, it controls the ignition period.

Besides, with respect to the part in which the actual drive shaft torque Td is smaller than the reference drive shaft torque Ta and so that it is necessary to increase the drive shaft torque Td, it may control the ignition time and the fuel injection amount.

Next, a fifth embodiment according to the present invention will be explained referring to from FIG. 20 to FIG. 23.

In this fifth embodiment, in the torque feedback control, in addition to the engine torque Te the line pressure of the multi-stepped automatic transmission 3 is controlled. In the above, so as to make clearly the contents of each embodiment, the explanation of the line pressure is omitted positively, however in the control during the gear shift, the line pressure control is very important.

Figure 21:
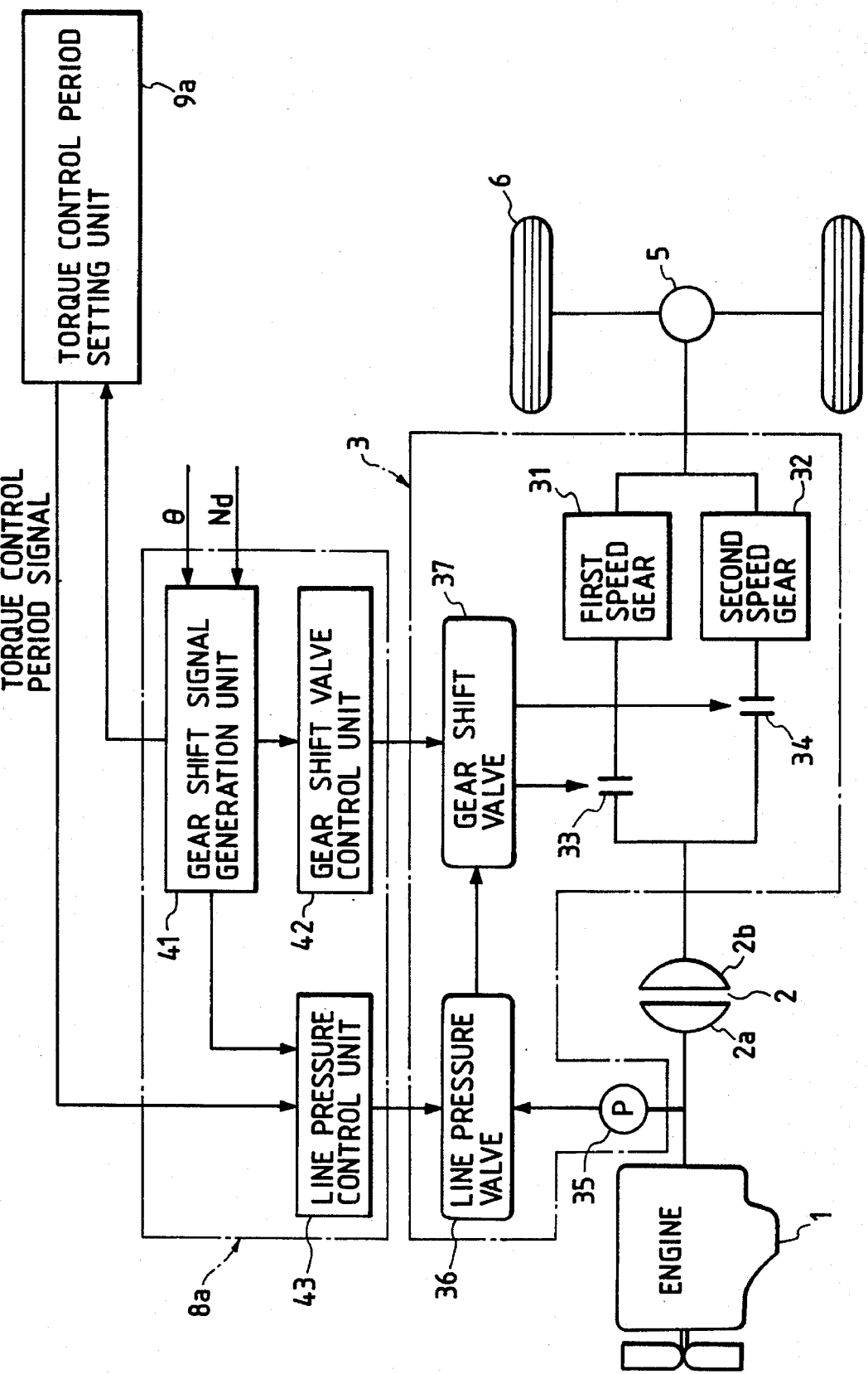
FIG. 21 is a functional block diagram showing a transmission controlling unit of the fifth embodiment of the drive shaft torque controlling apparatus according to the present invention.

Accordingly, for the explanation of the line pressure control, first of all, the constructions of the multi-stepped automatic transmission 3 and the automatic transmission controlling unit 8a will be explained referring to FIG. 21.

The multi-stepped automatic transmission 3 is constituted to an automatic transmission main body and a hydraulic control mechanism. The transmission main body comprises a necessary number of pairs of gears 31 and 32, each of which is determined respectively to have a input/output rotation velocity ratio. Clutches 33 and 34 are provided on every gears 31 and 32.

The hydraulic control mechanism comprises an oil pump 35, a line pressure adjusting valve 36 for adjusting the oil pressure from the oil pump 35, and a gear shift valve 37 for sending the adjusted pressure oil to one of the clutches 33 and 34.

Further, the automatic transmission controlling unit 8a comprises a gear shift signal generation unit 41 for preparing the throttle opening degree θ and the drive shaft speed Nd (proportional to the vehicle speed Vsp), a gear shift valve controlling unit 42 for outputting the line changeover signal to the gear shift valve 37 in response to the gear shift signal, and a line pressure controlling unit 43 for outputting the pressure adjustment signal to the line pressure adjusting valve 36 in response to the gear shift signal and the torque control period signal.

In a case that the gear shift is carried out, the line changeover signal output to the gear shift valve 37, so as to meet the clutch of the gear shift step in response to the gear shift signal, the hydraulic circuit is changed over, thereby the oil from the oil pump 35 supplies to the aimed clutch. In this case, the line pressure adjusting valve 36 adjusts the line pressure so as to obtain the meeting pressure in response to the aimed clutch.

In this fifth embodiment, even in the case of during the gear shift of the line pressure control, the line pressure controlling unit 43 carries out, thereby the gear shift jolt can be more reduced.

Namely, without the change of the line pressure, when the gear shift valve 37 changes over at a dash the oil circuit it causes the large gear shift jolt, however by the gear shift valve 37 the oil circuit is changed over and at the same time the line pressure is lowered, the oil pressure is changed over with the semi-engaged clutch state (weak meeting force state having slip) of the clutch, it generates the smoothing against the peak torque at the inertia phase etc., thereby the gear shift jolt can be reduced.

The motion of this fifth embodiment will be explained referring to time charts shown in FIG. 22 and FIG. 23.

Figure 22:
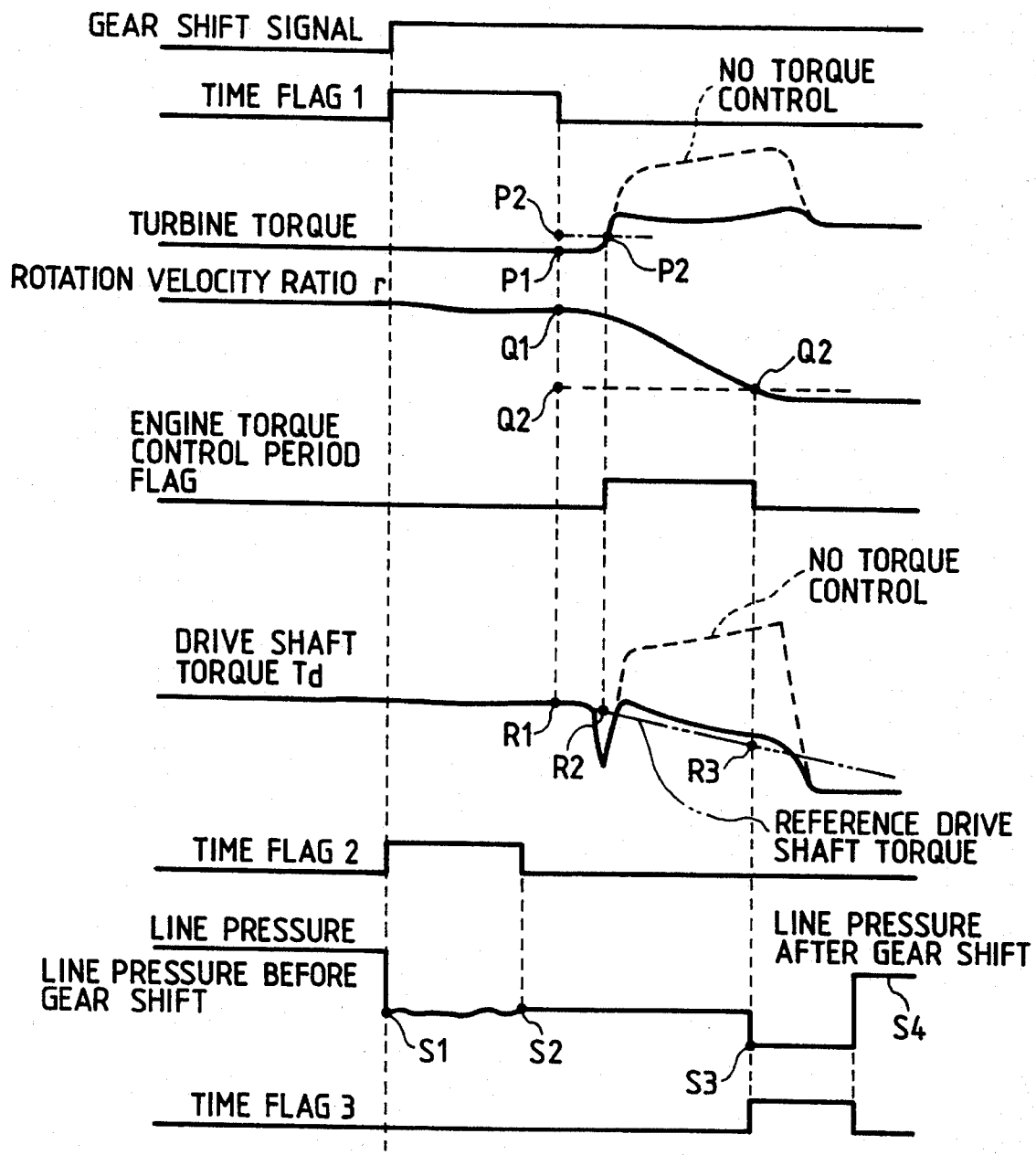
FIG. 22 is a time chart showing an up shift of the fifth embodiment of the drive shaft torque controlling apparatus according to the present invention.

FIG. 22 is a time chart showing during the up shift and shows that in addition to the time chart shown in FIG. 13 the motion explanation waveform is shown.

When the gear shift signal is changed over and at the same time the line pressure is varied to the line pressure S1 during the gear shift time which is calculated from the turbine torque Tt at a standard. The timer works at a determined time, and during this period it is controlled to the line pressure in response to the turbine torque Tt.

At the finishing time point of the timer flag 2, it is held to the line pressure at that time (it does not relate to correspond to the turbine torque Tt). From the finishing time point of the engine torque control, as much as the time is determined by the time flag 3, further it varies to the line pressure S3. This line pressure S3 is smaller than at a predetermined rate against the line pressure S4 necessary for meeting the clutch at after the gear shift.

Further, according to the kinds of the automatic transmissions, the time point for varying the line pressure S3 can determine not the finishing point of the engine torque control but can start to before the finishing point time, in such a case, once more threshold level is provided on the input/output rotation velocity ratio r and the line pressure S3 alteration starting point is determined. After the gear shift has finished, it controls the line pressure at after the gear shift in response to a new input/output rotation velocity ratio.

Figure 15:
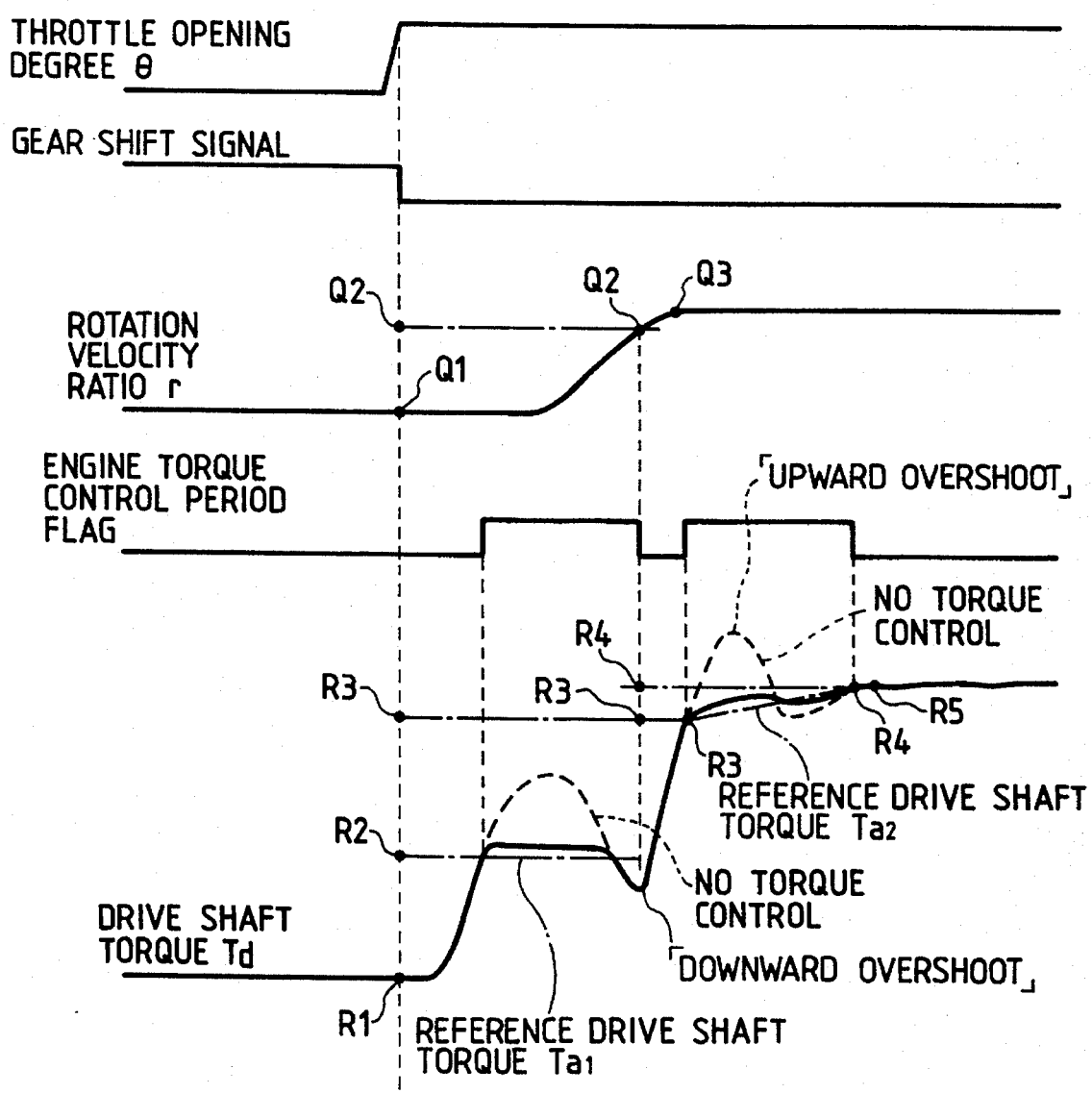
FIG. 15 is a time chart showing a down shift of the second embodiment of the drive shaft torque controlling apparatus according to the present invention.
Figure 16:
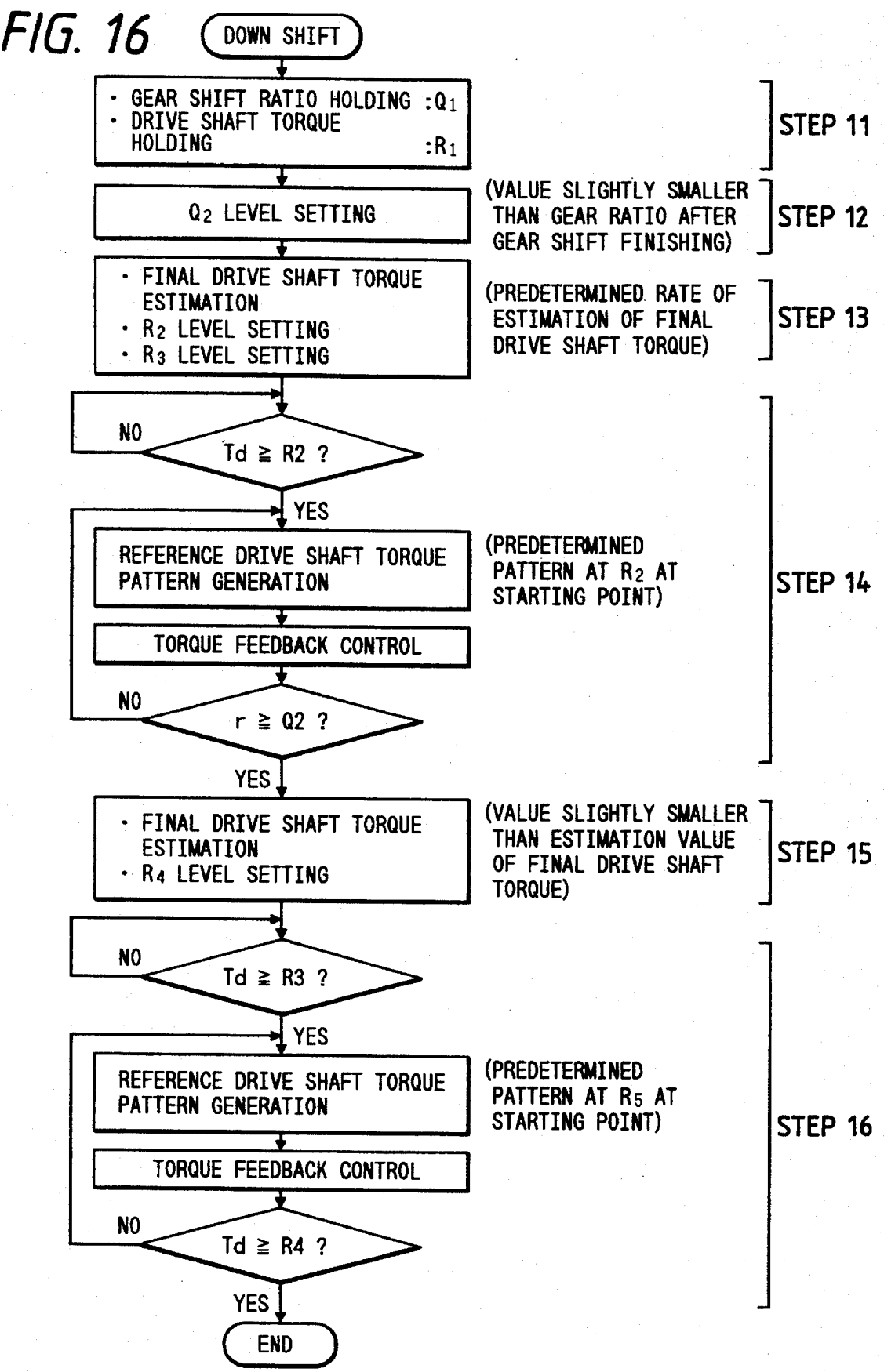
FIG. 16 is a flow chart showing the down shift of the second embodiment of the drive shaft torque controlling apparatus according to the present invention.
Figure 23:
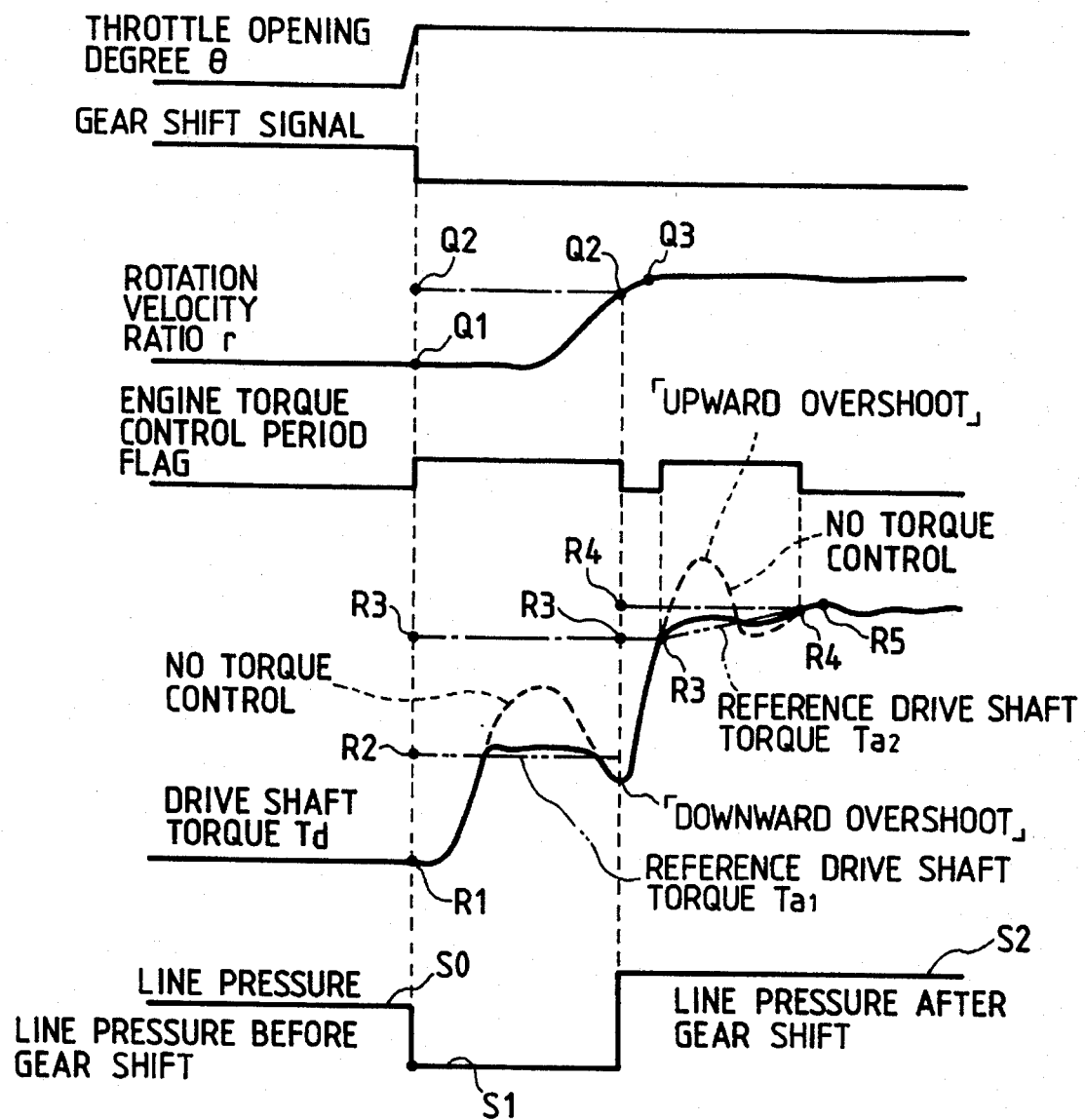
FIG. 23 is a time chart showing a down shift of the fifth embodiment of the drive shaft torque controlling apparatus according to the present invention.

FIG. 23 is a time chart showing during the down shift and shows that in addition to the time chart shown in FIG. 15 the motion explanation waveform is shown.

When the gear shift signal is changed over and at the same time the line pressure is varied to the line pressure S1 which has a predetermined rate and is smaller than with the line pressure S0 necessary for meeting the clutch before the gear shift. At the time point in which the restraint control of the "downward overshoot" has finished, it controls the line pressure S2 for necessary the meeting of the new clutch.

Further, at the mechanical gear shift starting of the multi-stepped automatic transmission 3, namely before the motion starting of the clutch, the line pressure control is carried out, as stated above, the reason why in a case that the hydraulic circuit is changed over, the clutch is made to show the semi-engaged clutch state.

The explanations with respect to other controls are omitted according to FIG. 13 and FIG. 15, together with the engine torque control, by controlling the line pressure the more smoothing drive shaft torque characteristic can be obtained.

Further, this fifth embodiment is explained that the line pressure control is added to the system of the second embodiment, however it can combine with the third embodiment or the fourth embodiment. In actually, in every system it is a common to carry out the line pressure control.

Next, the hardware aspect construction of the drive shaft torque controlling apparatus 15, 15a, 15b and 15c in the above stated embodiments will be explained.

In the prior art technique, the engine controlling unit 7 and the automatic transmission controlling unit 8 are provided on the vehicle as the in the distinct controlling apparatus and the independent form each other. However, for performing the control according to the present invention, it is necessary to exchange the control data between both units.

Figure 24:
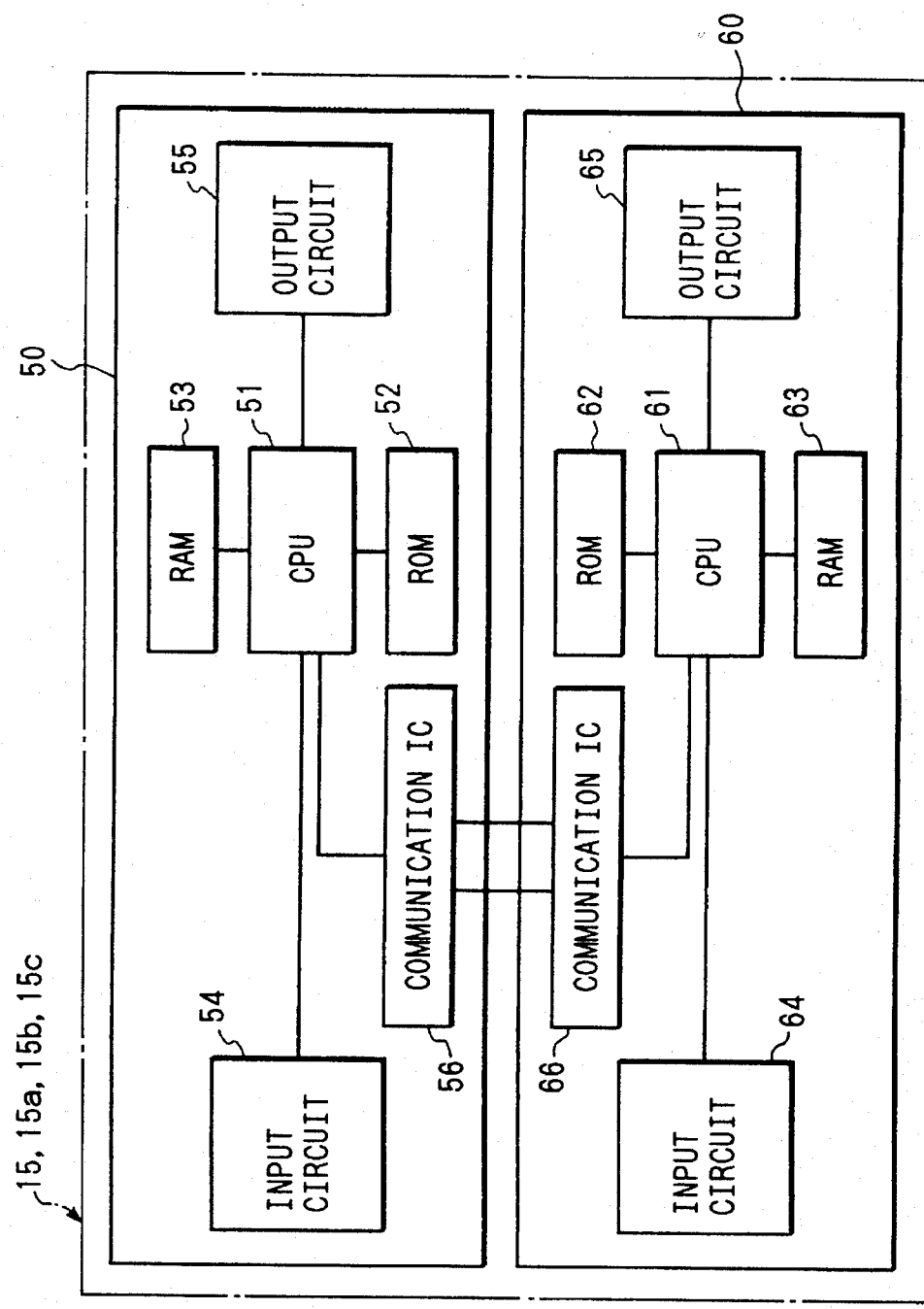
FIG. 24 is a circuitry diagram showing a drive shaft torque controlling apparatus of one embodiment of a drive shaft torque controlling apparatus according to the present invention.

Accordingly, with respect to the above stated embodiments, for example, as shown in FIG. 24, a communication IC 56 is mounted on a microcomputer 50 having a function of the engine controlling unit 7 and a communication IC 66 is mounted on a microcomputer 60 having a function of the automatic transmission controlling unit 8, respectively, and it can realized by using LAN system for connecting the communication IC 56 and the communication IC 66 with the serial transmission passage.

In the above stated construction, for example, on the microcomputer 60 having the function of the automatic transmission controlling unit 8, it may be at liberty to have the functions of the torque control period setting unit 9, the drive shaft torque calculating unit 10, the reference drive shaft torque executing unit 11 and the torque deviation executing unit 12 etc..

Further, in each microcomputer 50 and 60, in addition to the communication IC 56 and 66, CPU 51 and 61 for carrying out the various kinds of the executions and ROM 52 and 62 for storing the datum and programs so as to carry out the executions of CPU 51 and 61, RAM 53 and 63, input circuits 54 and 64, and output circuits 55 and 65 and so on are provided.

Figure 25:
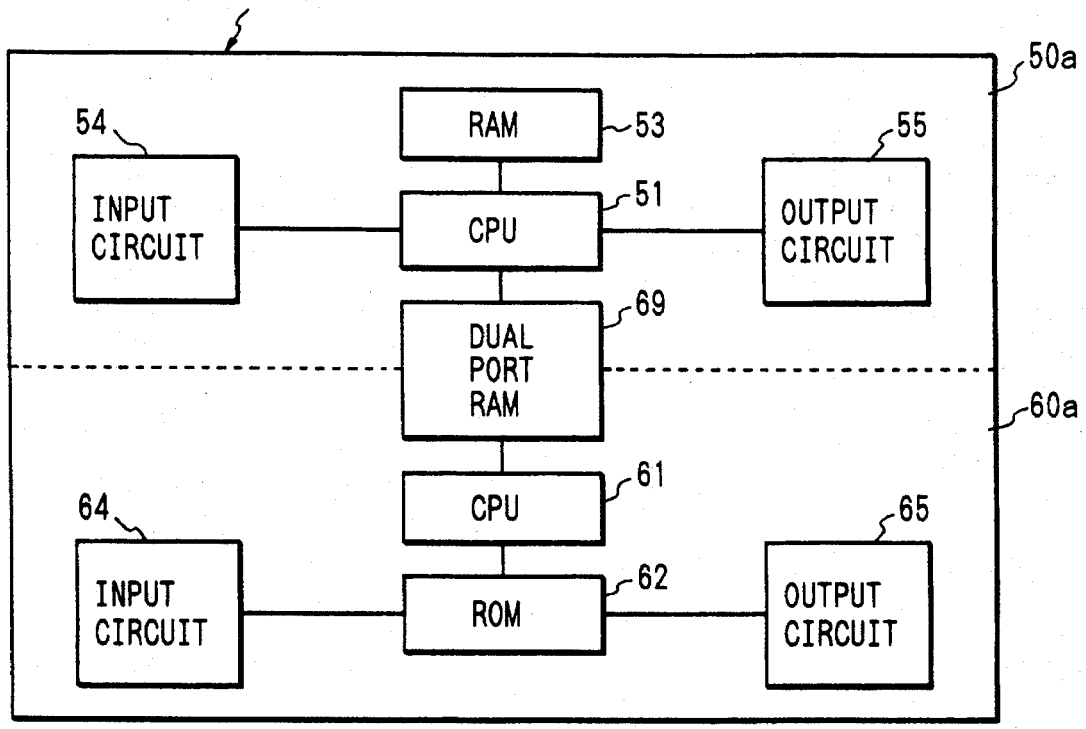
FIG. 25 is a circuitry diagram showing a drive shaft torque controlling apparatus of another embodiment of a drive shaft torque controlling apparatus according to the present invention.

However, recently there is apt to unify the engine controlling apparatus and the transmission controlling apparatus together. Then, as sown in FIG. 25, between the microcomputers 50a and 60a a dual port RAM 69 is provided on and through this dual port RAM 69 the datum of the microcomputers 50a and 60a are exchanged, thereby both microcomputers 50a and 60a can be unified as one body.

Figure 26:
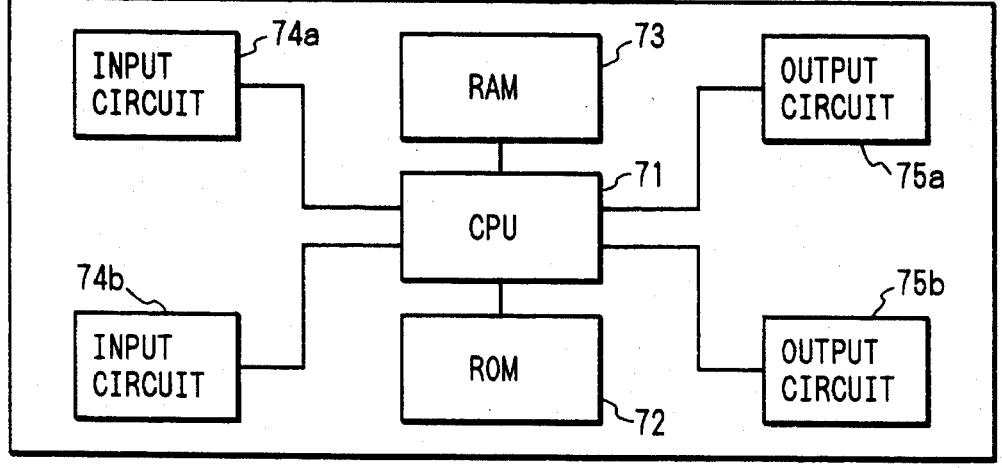
FIG. 26 is a circuitry diagram showing a further embodiment of a drive shaft torque controlling apparatus of according to the present invention.

Further, when the unification of the controlling apparatuses proceeds, as shown in FIG. 26, the functions of both apparatuses can be realized through a single microcomputer.

According to the above various embodiments from the second embodiment to the fifth embodiment of the present invention, since during the gear shift the feedback control of the drive shaft torque Td is carried out, the fluctuation amount of the engine torque Te is searched in advance at every gear shift stage during the gear shift, and therefore it is unnecessary to set the map, the time can be saved.

Further, at every gear shift, since the reference drive shaft torque Ta is determined and so as to decrease substantially zero the deviation d between the reference drive shaft torque Ta and the actual drive shaft torque Td the torque feedback control is carried out, even the multi-stepped automatic transmission and the hydraulic pressure control mechanism etc. are changed in time lapse, regardless of the change in time lapse, the gear shift jolt can be reduced surely.

Further, when the torque feedback control is carried out, since the drive shaft torque Td is obtained by the execution, it is unnecessary to provide the high cost torque sensor and it alters merely the controlling apparatus of the conventional automatic transmission mounted on the vehicle at the aspect of the software, the exact gear shift jolt can be realized, accordingly it can be heighten the productivity and also it can be reduced the manufacturing cost.

We claim:

1. In a drive shaft torque controlling apparatus for use in a vehicle comprising an engine, an automatic transmission having a torque converter, and a controlling apparatus installing at least one microcomputer therein and for controlling said automatic transmission, wherein the drive shaft torque controlling apparatus comprises a detecting means for detecting input information such as an engine speed, a throttle opening degree and an output shaft speed and a gear position signal of said automatic transmission; and an executing and assuming means for determining numerical values of an output shaft torque and an input/output rotation velocity ratio between an input shaft side rotation velocity and an output shaft side rotation velocity of said automatic transmission so as to control said engine and said automatic transmission through said input information, an engine characteristic map, a torque converter characteristic, a calculation formulas relating to an input shaft speed of said automatic transmission, a slip ratio of said automatic transmission, an input torque of said torque converter, and an accessory of said engine, and an accessory torque defined by a deviation value between a torque assumed from said engine characteristic map and a torque assumed from said torque converter characteristic.

2. In a drive shaft torque controlling method for use in a vehicle comprising an engine, an automatic transmission having a torque converter, and a controlling apparatus installing at least one microcomputer therein and for controlling said automatic transmission, wherein the drive shaft torque controlling method comprises steps of:

when said automatic transmission is during a non gear shift in which said automatic transmission is completed to met at a predetermined gear, from input information, executing and assuming an input/output rotation velocity ratio between an input shaft side rotation velocity and an output shaft rotation velocity, an input shaft speed, a slip ratio, a pump torque during non gear shift, and said input shaft torque; and using numerical value information relating to said assumed input/output rotation velocity ratio and said assumed input shaft torque so as to control said engine and said automatic transmission, and an accessory torque defined by a deviation value between a torque assumed from said engine characteristic map and a torque assumed from said torque converter characteristic is executed, assumed and stored.

3. In a drive shaft torque controlling method according to claim 2, wherein the drive shaft torque controlling method comprises steps of:

when said engine braking operates and a velocity of the automobile is transferred to a deceleration condition, giving a settled and predetermined value in advance to a value of said input shaft torque.

4. In a drive shaft torque controlling method for use in a vehicle comprising an engine, an automatic transmission having a torque converter, and a controlling apparatus installing at least one microcomputer therein and for controlling said automatic transmission, wherein the drive shaft torque controlling method comprises steps of:

when said automatic transmission is during a gear shift in which said automatic transmission is not meshed with a predetermined gear, from input information, executing an engine torque;

from numerical value information relating to said engine torque immediately after gear shift starting and a pump torque during a non gear shift immediately before the gear shift starting, executing, assuming and storing an accessory torque defined by a deviation value between a torque assumed form an engine characteristic map and a torque assumed from a torque converter characteristic and being loaded to said engine;

from said numerical value information relating to said accessory torque and said engine torque being changed from moment to moment, executing and assuming said pump torque during a gear shift;

executing and assuming said slip ratio and said input shaft torque;

from said input information and said slip ratio, executing and assuming said input shaft speed and an input/output rotation velocity ratio between an input shaft rotation velocity and an output shaft rotation velocity during the gear shift; and using said assumed numerical value information relating to said input shaft torque and said input/output rotation velocity ratio during said gear shift time to control said engine and said automatic transmission.

5. In a drive shaft torque controlling method for use in a vehicle comprising an engine, an automatic transmission having a torque converter, and a controlling apparatus installing at least one microcomputer therein and for controlling said automatic transmission, wherein the drive shaft torque controlling method comprises steps of:

when said automatic transmission is during said non gear shift and said torque converter is connected directly, from input information, executing an engine torque;

from numerical value information relating to said engine torque immediately after said direct connection condition and a pump torque during non gear shift immediately before said direct connection condition, executing, assuming and storing an accessory torque defined by a deviation value between a torque assumed from an engine characteristic map and a torque assumed from a torque converter characteristic;

from said numerical value information relating to said accessory torque and said engine torque, executing and assuming said pump torque at said direct connection condition;

executing and assuming a slip ratio and an input shaft torque;

from said input information and said slip ratio, executing and assuming an input shaft speed and an input/output rotation velocity ratio between an input shaft rotation velocity and an output shaft rotation velocity of said automatic transmission at said direct connection condition; and using said assumed numerical value information relating to said input/output rotation velocity ratio at said direct connection condition to control said engine and said automatic transmission.

6. In a drive shaft torque controlling apparatus for use in a vehicle comprises a drive shaft torque operation means in which an engine is connected to a multi-stepped automatic transmission through a torque converter and a torque of a drive shaft being an output shaft of said multi-stepped automatic transmission is variable, an engine speed sensor for detecting a speed of said engine, and a drive shaft speed sensor for detecting a speed of said drive shaft, wherein the drive shaft torque controlling apparatus comprises:

an engine torque executing means for obtaining an engine torque from an engine torque characteristic in which a relationship between said engine speed and an engine torque is determined and said engine speed detected through said engine speed sensor;

a turbine speed grasping means for grasping a speed of a turbine for constituting said torque converter;

a torque ratio executing means for obtaining a torque ratio of said torque converter from said grasped turbine speed and said detected engine speed;

a turbine torque executing means for obtaining a torque of said turbine from said torque ratio and said engine torque;

an input/output rotation velocity ratio executing means for obtaining an input/output rotation velocity ratio between an input shaft rotation velocity and an output shaft rotation velocity of said multi-stepped automatic transmission from said grasped turbine speed and said drive shaft speed detected by said drive shaft sensor;

a drive shaft torque executing means for obtaining said drive shaft torque from said turbine torque and said input/output rotation velocity ratio;

a reference drive shaft torque setting means for predetermining a reference drive shaft torque in response to a value of said drive shaft torque of before mechanical gear shift motion starting of said multi-stepped automatic transmission;

a torque deviation executing means for obtaining a deviation between said reference drive shaft torque determined by said reference drive shaft torque setting means and said drive shaft torque determined by said drive shaft torque executing means; and an operation amount controlling means for outputting an operation amount to said drive shaft torque operation means by obtaining said operation amount of said drive shaft torque operation means in response to said deviation varying said drive shaft torque to decrease substantially zero said deviation.

7. A drive shaft torque controlling apparatus according to claim 6, wherein said turbine speed grasping means comprises:

a capacity coefficient executing means for obtaining a capacity coefficient of said torque converter from said engine torque and said engine speed;

a slip ratio executing means for obtaining a slip ratio of said torque converter from a predetermined relationship between said capacity coefficient of said torque converter and said rotation ratio and said capacity efficiency obtained by said capacity coefficient executing means; and a turbine speed executing means for obtaining said turbine speed multiplying said engine speed by said speed ratio.

8. A drive shaft torque controlling apparatus according to claim 6, wherein said turbine speed grasping means comprises:

a turbine speed detecting means for measuring directly the speed of said turbine.

9. A drive shaft torque controlling apparatus according to claim 6, wherein in a case that said torque control period setting means is an up-shift:

when said turbine torque obtained by said turbine torque executing means has a slightly larger value more than said turbine torque of before mechanical gear shift motion starting of said multi-stepped automatic transmission, a control starting period of said drive shaft torque is performed, and when said input/output rotation velocity ratio obtained by said input/output rotation velocity ratio executing means has a slightly larger value less than said turbine torque before a mechanical gear shift motion finishing of said multi-stepped automatic transmission, a control finishing period of said drive shaft torque is performed.

10. A drive shaft torque controlling apparatus according to claim 9, wherein in a case that said reference drive shaft torque setting means is an up-shift:

a value of said drive shaft torque before a mechanical gear shift motion starting of said multi-stepped automatic transmission is made as a basic point, and a reference drive shaft torque for changing said drive shaft torque according to a predetermined inclination every said gear shift stage is generated.

11. A drive shaft torque controlling apparatus according to claim 6, wherein in a case that said torque control period setting means is a down shift:

by dividing said drive shaft torque before a mechanical gear shift motion starting of said multi-stepped automatic transmission has been finished at a predetermined rate, a first drive shaft torque level and a second drive shaft torque level are determined, said second drive shaft torque level is larger than said first drive shaft torque level;

when said drive shaft torque obtained by said drive shaft torque executing means has a value more than said first drive shaft torque level, a first control starting period is performed, and when said input/output rotation velocity ratio obtained by said input/output rotation velocity ratio executing means has a small value slightly more than said input/output rotation velocity ratio of a mechanical gear shift motion finishing time of said multi-stepped automatic transmission, a first control finishing period is performed; and when said drive shaft torque obtained by said drive shaft torque executing means has a value more than said second drive shaft torque level, a second control starting period is performed, and when said input/output rotation velocity ratio obtained by said input/output rotation velocity ratio executing means has a small value slightly more than of said input/output rotation velocity ratio of a mechanical gear shift motion finishing time of said multi-stepped automatic transmission, a second control finishing period is performed.

12. A drive shaft torque controlling apparatus according to claim 11, wherein in a case that said reference drive shaft torque setting means is a down shift:

during from said first control starting period to said first control finishing period, as said first drive shaft torque level is as a base point a reference drive shaft torque for varying said drive shaft torque according to a predetermined inclination every gear shift stage is generated, and during from said second control starting period to said second control finishing period, as said second drive shaft torque level is as a base point a reference drive shaft torque for varying said drive shaft torque according to a predetermined inclination every gear shift stage is generated.

13. A drive shaft torque controlling apparatus according to claim 6, wherein said operation amount is selected from at least one of an ignition period of said engine, an air flow amount for supplying said engine, and a flow amount of a fuel for supplying to said engine.

14. A drive shaft torque controlling apparatus according to claim 6, wherein when said drive shaft torque obtained by said drive shaft torque executing means is smaller than said reference drive torque, said operation amount controlling means controls to make large said flow amount of air for supplying to said engine.

15. A drive shaft torque controlling apparatus according to claim 6, wherein said multi-stepped automatic transmission comprises a gear shaft at every gear shift step, plural gear shift clutches for connecting said gear at every gear shift step to said torque converter, and an adjusting mechanism for adjusting a meeting force of said gear shift clutch at every gear shift step; and during a gear shift period, said operation amount controlling means controls an operation amount of said adjusting mechanism.

16. In a drive shaft torque controlling apparatus for use in a vehicle comprises a drive shaft torque operating means in which an engine is connected to a multi-stepped automatic transmission through a torque converter and a torque of a drive shaft being an output shaft of said multi-stepped automatic transmission is variable, wherein the drive shaft torque controlling apparatus comprises:

a drive shaft torque grasping means for grasping said drive shaft torque;

a reference drive shaft torque setting means for determine a reference drive shaft in response to said drive shaft before mechanical gear shift motion starting of said multi-stepped automatic transmission;

a torque deviation executing means for obtaining a deviation between said reference drive shaft torque determined by said reference drive shaft torque setting means and said drive shaft torque determined by said drive shaft torque executing means; and an operation amount controlling means for outputting an operation amount to said drive shaft torque operation means by obtaining said operation amount of said drive shaft torque operation means in response to said deviation varying said drive shaft torque to decrease substantially zero said deviation;

when said drive shaft torque obtained by said drive shaft torque executing means is smaller than said reference drive torque, said operation amount controlling means controls to make large said flow amount of air for supplying to said engine.

17. A power train control apparatus for use in an automobile comprises:

an engine;

an automatic transmission having a torque converter; and a controlling means installing at least one microcomputer therein and for controlling said engine and said automatic transmission, wherein the power train control apparatus comprises further:

a drive torque executing means for assuming a torque of an output shaft of said automatic transmission, wherein said drive torque executing means comprises:

a first drive torque executing means for assuming said torque of said output shaft of said automatic transmission by utilizing a preset stored engine torque characteristic;

a second drive torque executing means for assuming said torque of said output shaft of said automatic transmission by utilizing a preset stored torque converter characteristic;

a change-over means for changing over to assume said torque of said output shaft of said automatic transmission by utilizing said second drive torque executing means at an area in which a slip of said torque converter is large and by utilizing said first drive torque executing means at an area in which the slip of said torque converter is small.

18. A power train control apparatus for use in an automobile comprises:

an engine;

an automatic transmission having a torque converter; and a controlling means installing at least one microcomputer therein and for controlling said engine and said automatic transmission, wherein said first drive torque executing means for assuming said torque of said output shaft of said automatic transmission by utilizing a preset stored engine torque characteristic, according to claim 17, comprises:

an engine torque characteristic storing means for preset storing an engine torque characteristic;

a slip ratio calculating means for calculating a slip ratio of said torque converter;

a torque ratio calculating means for calculating a torque ratio of said torque converter by inputting slip ratio information from said slip ratio calculating means;

a turbine torque executing means for outputting a torque of an output shaft of said torque converter by multiplying an engine torque read out from said engine torque characteristic storing means by a torque ratio outputted from said torque ratio calculating means; and an automatic transmission output shaft torque calculating for outputting said torque of said output shaft of said automatic transmission multiplying a torque of said output shaft of said torque converter from said turbine torque executing means by a gear ratio of a gear stage being meshed with at the present time.

19. A power train control apparatus for use in an automobile comprises:

an engine;

an automatic transmission having a torque converter; and a controlling means installing at least one microcomputer therein and for controlling said engine and said automatic transmission, wherein said engine torque characteristic storing means, according to claim 18, stores said engine torque having an opening degree of an acceleration pedal or an opening degree of a throttle valve and an engine speed as a parameter.

20. A power train control apparatus for use in an automobile comprises:

an engine;

an automatic transmission having a torque converter; and a controlling means installing at least one microcomputer therein and for controlling said engine and said automatic transmission, wherein said engine torque characteristic storing means, according to claim 18, stores said engine torque having a flow amount of an engine intake air flow and an engine speed as a parameter.

21. A power train control apparatus for use in an automobile comprises:

an engine;

an automatic transmission having a torque converter; and a controlling means installing at least one microcomputer therein and for controlling said engine and said automatic transmission, wherein said engine torque characteristic storing means, according to claim 18, stores said engine torque having a flow amount of an engine intake air flow and an engine speed which are executed in accordance with an intake air pressure and an intake air temperature as a parameter.

22. A power train control apparatus for use in an automobile comprises:

an engine;

an automatic transmission having a torque converter; and a controlling means installing at least one microcomputer therein and for controlling said engine and said automatic transmission, wherein said engine torque characteristic storing means, according to claim 18, stores said engine torque having an intake air pressure, an intake air temperature and an engine speed as a parameter.

23. A power train control apparatus for use in an automobile comprises:

an engine;

an automatic transmission having a torque converter; and a controlling means installing at least one microcomputer therein and for controlling said engine and said automatic transmission, wherein said engine torque characteristic storing means, according to claim 18, stores said engine torque having a width of a drive pulse of an injector and an engine speed as a parameter.

24. A power train control apparatus for use in an automobile comprises:

an engine;

an automatic transmission having a torque converter; and a controlling means installing at least one microcomputer therein and for controlling said engine and said automatic transmission, wherein said second drive torque executing means, according to claim 18, comprises:

a pump capacity coefficient characteristic storing means for storing in advance said torque converter;

a slip ratio calculating means for calculating a slip ratio of said torque converter;

a torque ratio calculating means for calculating a torque ratio of said torque converter by inputting slip ratio information from said slip ratio calculating means;

a torque converter input calculating means for calculating a torque converter input torque by multiplying an engine speed square signal from said pump capacity coefficient read out from said pump capacity coefficient characteristic storing means and an engine speed squaring means;

a turbine torque executing means for outputting a torque of an output shaft of said torque converter by multiplying an engine torque read out from said engine torque characteristic storing means to a torque ratio outputted from said torque ratio calculating means; and an automatic transmission output shaft torque calculating for outputting said torque of said output shaft of said automatic transmission multiplying a torque of said output shaft of said torque converter from said turbine torque executing means by a gear ratio of a gear stage being meshed with at the present time.

25. A power train control apparatus for use in an automobile comprises:

an engine;

an automatic transmission having a torque converter; and a controlling means installing at least one microcomputer therein and for controlling said engine and said automatic transmission, according to claim 17, wherein the power train control apparatus comprises further:

a change-over means for changing over to assume said torque of said output shaft of said automatic transmission by utilizing said second drive torque executing means at an area in which a slip of said torque converter is large and by utilizing said first drive torque executing means at an area in which the slip of said torque converter is small; and an accessory torque leaning means;

said accessory torque leaning means leans and stores a torque deviation part just before the changing-over time of said first torque executing means and said second torque executing means as a load torque part of an accessory means of said engine;

thereby after said second drive torque executing means has changed over to said first drive torque executing means, said load torque part of said accessory torque leaning means is requested by reducing said assumed torque from said first drive torque executing means.

26. A power train control apparatus for use in an automobile comprises:

an engine;

an automatic transmission having a torque converter; and a controlling means installing at least one microcomputer therein and for controlling said engine and said automatic transmission, wherein said engine torque control amount executing means, according to claim 17, comprises:

a deviation calculating means for calculating a deviation for a predetermined executing period between a target torque value generated from said target torque generating means and a drive torque value executed from said drive torque executing means; and an engine torque control amount change-over means for calculating an engine torque control amount multiplying a change-over coefficient which is set in advance and stored by a deviation value which is calculated from said deviation calculating means.

27. A power train control apparatus for use in an automobile comprises:

an engine;

an automatic transmission having a torque converter; and a controlling means installing at least one microcomputer therein and for controlling said engine and said automatic transmission, according to claim 26, wherein said change-over coefficient of said engine torque control amount change-over means is zero when said drive torque value executed from said drive torque executing means is smaller than said target torque value generated from said target torque generating means within a first predetermined period from said actual shift period, said change-over coefficient of said engine torque control amount change-over means has a predetermined inherent value during a second predetermined period from said actual shift period, and said change-over coefficient of said engine torque control amount change-over means is used dividing said predetermined inherent value by a coefficient of a lapse time exceeding said second predetermined period.

28. A power train control apparatus for use in an automobile comprises:

an engine;

an automatic transmission having a torque converter; and a controlling means installing at least one microcomputer therein and for controlling said engine and said automatic transmission, wherein in said target torque generating means for generating the target torque during shifting based on a torque which is assumed from said drive torque executing means, an actual shift period is recognized at a time in which said assumed turbine torque assumed from said turbine torque executing means in said drive torque executing means is larger than a predetermined value within a predetermined time after the shift command, said drive torque within said actual shift period or a mean drive torque just before said actual shift period is temporary stored as a drive torque before the shift, a drive torque after the shift is calculated from said drive torque before the shift and a gear ratio between the shift before and the shift after, a slope angle against a lapse time of said target torque, which is generated from said target torque generating means, is calculated from a deviation part between said drive torque before the shift and said drive torque after the shift and a preset predetermined shift time, and said target torque is calculated in accordance with said slope angle every a predetermined executing period each.

* * * * *